United States Patent
Uchiyama et al.

(10) Patent No.: US 11,457,447 B2
(45) Date of Patent: *Sep. 27, 2022

(54) COMMUNICATION DEVICE, COMMUNICATION METHOD, AND COMPUTER PROGRAM FOR SENSING OF RESOURCES USED IN INTER-DEVICE COMMUNICATIONS

(71) Applicant: Sony Corporation, Tokyo (JP)

(72) Inventors: Hiromasa Uchiyama, Tokyo (JP); Yifu Tang, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 140 days.

This patent is subject to a terminal disclaimer.

(21) Appl. No.: 16/925,419

(22) Filed: Jul. 10, 2020

(65) Prior Publication Data
US 2020/0344743 A1  Oct. 29, 2020

Related U.S. Application Data

(63) Continuation of application No. 16/095,704, filed as application No. PCT/JP2017/015518 on Apr. 18, 2017, now Pat. No. 10,757,709.

(30) Foreign Application Priority Data

May 12, 2016 (JP) .............................. JP2016-096239
Nov. 4, 2016 (JP) .............................. JP2016-216751

(51) Int. Cl.
*H04L 12/28* (2006.01)
*H04W 72/04* (2009.01)
(Continued)

(52) U.S. Cl.
CPC ........... *H04W 72/048* (2013.01); *H04W 4/40* (2018.02); *H04W 72/02* (2013.01); *H04W 72/04* (2013.01);
(Continued)

(58) Field of Classification Search
CPC ..... H04W 72/02; H04W 92/18; H04W 28/26; H04W 72/04; H04W 72/0446; H04W 72/0453; H04L 5/001
(Continued)

(56) References Cited

U.S. PATENT DOCUMENTS

2017/0142766 A1  5/2017  Kim
2018/0035276 A1  2/2018  Kang et al.
(Continued)

FOREIGN PATENT DOCUMENTS

EP  3 439 403 A1  2/2019
IN  1872CHE2015  4/2015
(Continued)

OTHER PUBLICATIONS

Lee et al. (U.S. Appl. No. 62/334,444) "Efficient sensing and retransmission in V2X" May 10, 2016.*
(Continued)

*Primary Examiner* — John Pezzlo
(74) *Attorney, Agent, or Firm* — Xsensus LLP

(57) ABSTRACT

A communication device that enables sensing of efficient resources in inter device communication such as V2X communication, including a control unit configured to allocate a resource area in which a resource is selectable by a terminal device that executes inter-device communication, and to provide information regarding a range of sensing of the resource area to the terminal device.

14 Claims, 35 Drawing Sheets

(51) Int. Cl.

| | | |
|---|---|---|
| *H04W 72/02* | (2009.01) | |
| *H04W 74/08* | (2009.01) | |
| *H04W 4/40* | (2018.01) | |
| *H04W 72/10* | (2009.01) | |
| *H04J 1/16* | (2006.01) | |
| *H04W 76/28* | (2018.01) | |
| *H04W 76/14* | (2018.01) | |

(52) U.S. Cl.
 CPC ....... *H04W 72/0473* (2013.01); *H04W 72/10* (2013.01); *H04W 74/0808* (2013.01); *H04W 76/14* (2018.02); *H04W 76/28* (2018.02)

(58) Field of Classification Search
 USPC .......................... 370/252, 329, 386, 430, 442
 See application file for complete search history.

(56) References Cited

U.S. PATENT DOCUMENTS

| | | | | |
|---|---|---|---|---|
| 2019/0090250 | A1* | 3/2019 | Lee | .................... H04W 72/0446 |
| 2019/0124669 | A1 | 4/2019 | Luo et al. | |
| 2020/0090433 | A1 | 3/2020 | Johnson et al. | |
| 2020/0296690 | A1* | 9/2020 | Lee | ......................... H04W 4/40 |
| 2020/0305152 | A1* | 9/2020 | Yasukawa | .............. H04W 92/18 |

FOREIGN PATENT DOCUMENTS

| | | |
|---|---|---|
| JP | 2015-508943 A | 3/2015 |
| WO | 2008/126295 A1 | 10/2008 |
| WO | 2015126115 A1 | 8/2015 |
| WO | 2017/179286 A1 | 10/2017 |

OTHER PUBLICATIONS

Lee et al. (U.S. Pat. No. 319,733) "Efficientsensing and retransmission in V2X" Apr. 7, 2016.*

Ericsson, "Sidelink Resource Allocaton in V2X", 3GPP TSG-RAN WG2 #93 Tdoc R2-161566 Malta. Feb. 15-19, 2016.

Japanese Office Action dated Nov. 26, 2019, in Japanese Patent Application No. 2016-216751, 8 pages.

Huawei, HiSilicon, Consideration on Mode 2 resource allocation, 3GPP TSG RAN WG1 Meeting #76bis, R1-141593, Mar. 31-Apr. 4. 2014, with cover page, 4 pages.

Extended European Search Report dated April 3, 2019 in European Application No. 17795896.4-1215.

Huawei, Hisilicon, "UE autonomous resource selection," R1-160307, 3GPP TSG RAN WG1 Meeting #84, St Julian's Malta, Feb. 15-19, 2016, pp. 1-6.

Nokia, Alcatel-Lucent Shanghai Bell, "On sensing with semi-persistent transmission," R1-165042, 3GPP TSG RAN WG1 Meeting #85, Nanjing, China May 23-27, 2016, pp. 1-5.

NTT Docomo, Inc., "Transmitter UE behaviour for sensing-based resource allocation," R1-165192, 3GPP TSG RAN WG1 Meeting #85, Nanjing, China May 23-27, 2016, pp. 1-7.

Qualcomm Incorporated, "V2V System Level Performance," R1-161132, 3GPP TSG RAN WG1 Meeting #84, St Julian's Malta, Feb. 15-19, 2016, pp. 1-11.

English-language translation of International Search Report and Written Opinion for International Application No. PCT/JP2017/015518 dated May 23, 2017.

* cited by examiner

# COMMUNICATION DEVICE, COMMUNICATION METHOD, AND COMPUTER PROGRAM FOR SENSING OF RESOURCES USED IN INTER-DEVICE COMMUNICATIONS

CROSS-REFERENCE TO RELATED APPLICATIONS

The present application is a continuation of U.S. application Ser. No. 16/095,704, filed Oct. 23, 2018, which is based on PCT filing PCT/JP2017/015518, filed Apr. 18, 2017, which claims priority to JP 2016-096239, filed May 12, 2016, and JP 2016-216751, filed Nov. 4, 2016, the entire contents of each are incorporated herein by reference.

TECHNICAL FIELD

The present disclosure relates to a communication device, a communication method, and a computer program.

Techniques for allocating resources in device to device (D2D) communication between terminal devices have been disclosed (for example, Patent Literature 1).

On the other hand, in recent years, anticipation of in-vehicle communication (V2X communication) to implement future automatic driving has been increasing. "V2X communication" is an abbreviation of "vehicle to X communication" and refers to a system in which a "vehicle" communicates with an "object." Here, examples of the "object" include a vehicle, a facility (infrastructure/network), and a pedestrian (V2V, V2I/N, or V2P). As wireless communication for vehicles, development of 802.11p-based dedicated short range communication (DSRC) has mainly advanced so far, but in recent years, discussions on standardization of "LTE-based V2X" which is LTE-based in-vehicle communication have started.

CITATION LIST

Patent Literature

Patent Literature 1: JP 2015-508943T

DISCLOSURE OF INVENTION

Technical Problem

The present disclosure proposes a novel and improved communication device, communication method, and computer program that enable sensing of efficient resources in inter-device communication such as V2X communication.

Solution to Problem

According to the present disclosure, there is provided a communication device including: a control unit configured to allocate a resource area in which a resource is selectable by a terminal device that executes inter-device communication, and to provide information regarding a range of sensing of the resource area to the terminal device.

In addition, according to the present disclosure, there is provided a communication device including: a control unit configured to select a resource from a resource area allocated by a base station and to determine a range of sensing of the resource area in accordance with a situation when inter-device communication is executed using the selected resource.

In addition, according to the present disclosure, there is provided a communication method including: allocating a resource area in which a resource is selectable by a terminal device that executes inter-device communication, and providing information regarding a range of sensing of the resource area to the terminal device.

In addition, according to the present disclosure, there is provided a communication method including: selecting a resource from a resource area allocated by a base station and determining a range of sensing of the resource area in accordance with a situation when inter-device communication is executed using the selected resource.

In addition, according to the present disclosure, there is provided a computer program causing a computer to execute: allocating a resource area in which a resource is selectable by a terminal device that executes inter-device communication, and providing information regarding a range of sensing of the resource area to the terminal device.

In addition, according to the present disclosure, there is provided a computer program causing a computer to execute: selecting a resource from a resource area allocated by a base station and determining a range of sensing of the resource area in accordance with a situation when inter-device communication is executed using the selected resource.

Advantageous Effects of Invention

According to the present disclosure described above, a novel and improved communication device, communication method, and computer program that enable sensing of efficient resources in inter-device communication such as V2X communication is provided.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
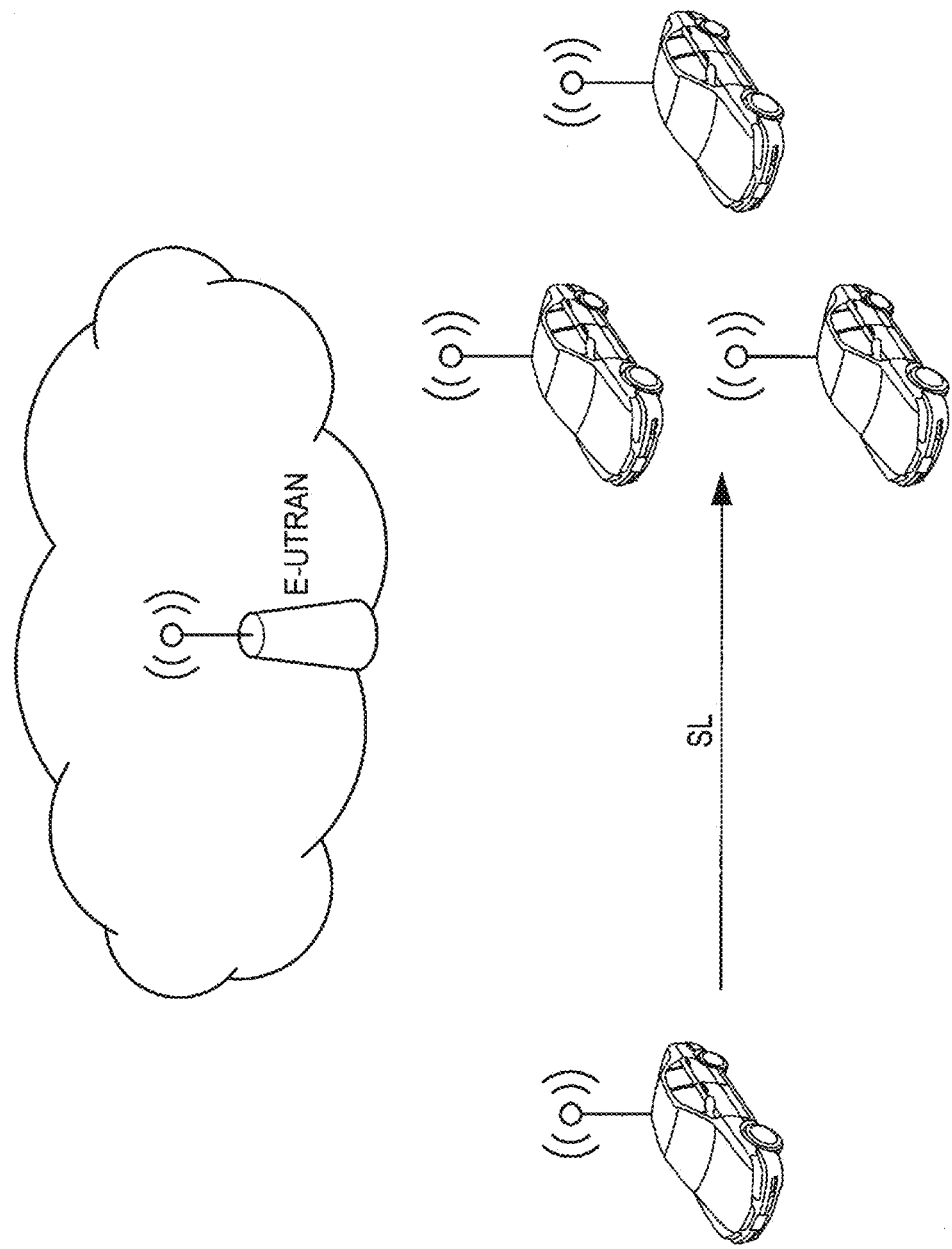
FIG. 1 is an explanatory diagram for describing a V2X operation scenario.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.

1. Embodiment of present disclosure
1.1. Overview
1.2. Example
1.3. Configuration example
2. Application examples
3. Conclusion

1. EMBODIMENT OF PRESENT DISCLOSURE

1.1. Overview

First, an overview of an embodiment of the present disclosure will be described.

As described above, in recent years, anticipation of in-vehicle communication (V2X communication) to implement future automatic driving has been increasing. "V2X communication" is an abbreviation of "vehicle to X communication" and refers to a system in which a "vehicle" communicates with an "object." Here, examples of the "object" include a vehicle, a facility (infrastructure/network), and a pedestrian (V2V, V2I/N, or V2P). As wireless communication for vehicles, development of 802.11p-based DSRC has mainly advanced so far, but in recent years, discussions on standardization of "LTE-based V2X" which is LTE-based in-vehicle communication have started.

Examples of cases in which V2X communication is used are listed below. There have been demands for communication such as periodic message transmission in which a message is periodically transmitted to a vehicle for the purpose of safety or an event trigger message providing necessary information in accordance with an event (3GPP TR 22.885).

(V2X Use Case Examples)
1. Forward collision warning
2. Control loss warning
3. V2V use case for emergency vehicle warning
4. V2V emergency stop use case
5. Cooperative adaptive cruise control
6. V2I emergency stop use case
7. Queue warning
8. Road safety services
9. Automated parking system
10. Wrong way driving warning
11. V2V message transfer under operator control
12. Pre-crash sensing warning
13. V2X in areas outside network coverage
14. V2X road safety service via infrastructure
15. V2I/V2N traffic flow optimization
16. Curve speed warning
17. Warning to pedestrian against pedestrian collision
18. Vulnerable road user (VRU) safety
19. V2X by UE type RSU
20. V2X minimum QoS
21. Use case for V2X access when roaming
22. Pedestrian road safety via V2P awareness messages
23. Mixed use traffic management
24. Enhancing positional precision for traffic participants Examples of requirements based on these use cases are shown below.

TABLE 1

Example parameters for V2X Services

| | Effective range | Absolute velocity of a UE supporting V2X Services | Relative velocity between 2 UEs supporting V2X Services |
|---|---|---|---|
| #1 (suburban) | 200 m | 50 kmph | 100 kmph |
| #2 (freeway) | 320 m | 160 kmph | 280 kmph |
| #3 (autobahn) | 320 m | 280 kmph | 280 kmph |
| #4 (NLOS/urban) | 150 m | 50 kmph | 100 kmph |
| #5 (urban intersection**) | 50 m | 50 kmph | 100 kmph |
| #6 (campus/shopping area) | 50 m | 30 kmph | 30 kmph |

| | Maximum tolerable latency | Minimum radio layer message reception reliability (probability that the recipient gets it within 100 ms) | Example Cumulative transmission reliability |
|---|---|---|---|
| #1 (suburban) | 100 ms | 90% | 99% |
| #2 (freeway) | 100 ms | 80% | 96% |
| #3 (autobahn) | 100 ms | 80% | 96% |
| #4 (NLOS/urban) | 100 ms | 90% | 99% |
| #5 (urban intersection**) | 100 ms | 95% | — |
| #6 (campus/shopping area) | 100 ms | 90% | 99% |

To achieve the above requirements, standardization of a physical layer of V2X communication has already started in 3GPP. V2I/N and V2P have been standardized while focus has been performed focusing on standardization of the V2V communication which is inter-vehicle communication.

A base technology of V2X communication is D2D communication which was standardized in 3GPP in the past. Since D2D communication is inter-terminal communication that does not go through a base station, enhancing it by applying it to V2V communication and V2P communication (it can also be applied to some V2I communication) can be considered. Such an interface between terminals is referred to as a PC5 interface.

Further, enhancing V2I communication and V2N communication by applying them to existing communication between a base station and a terminal can be considered. Such an interface between a base station and a terminal is referred to as a Uu interface.

As described above, in order to implement V2X communication, it is necessary to enhance the PC5 interface and the Uu interface to meet the requirements.

The main enhancement points include, for example, improvement of resource allocation, countermeasures against a Doppler frequency, establishment of a synchronization technique, implementation of low power consumption communication, implementation of low delay communication, and so on.

(V2X Operation Scenario)

A V2X operation scenario will be described. It is based on the V2V communication. Further, in the following description, if one automobile is replaced with a pedestrian, it becomes V2P communication, and in a case in which it terminates at a facility or a network, it becomes V2I/N communication.

Figure 2:
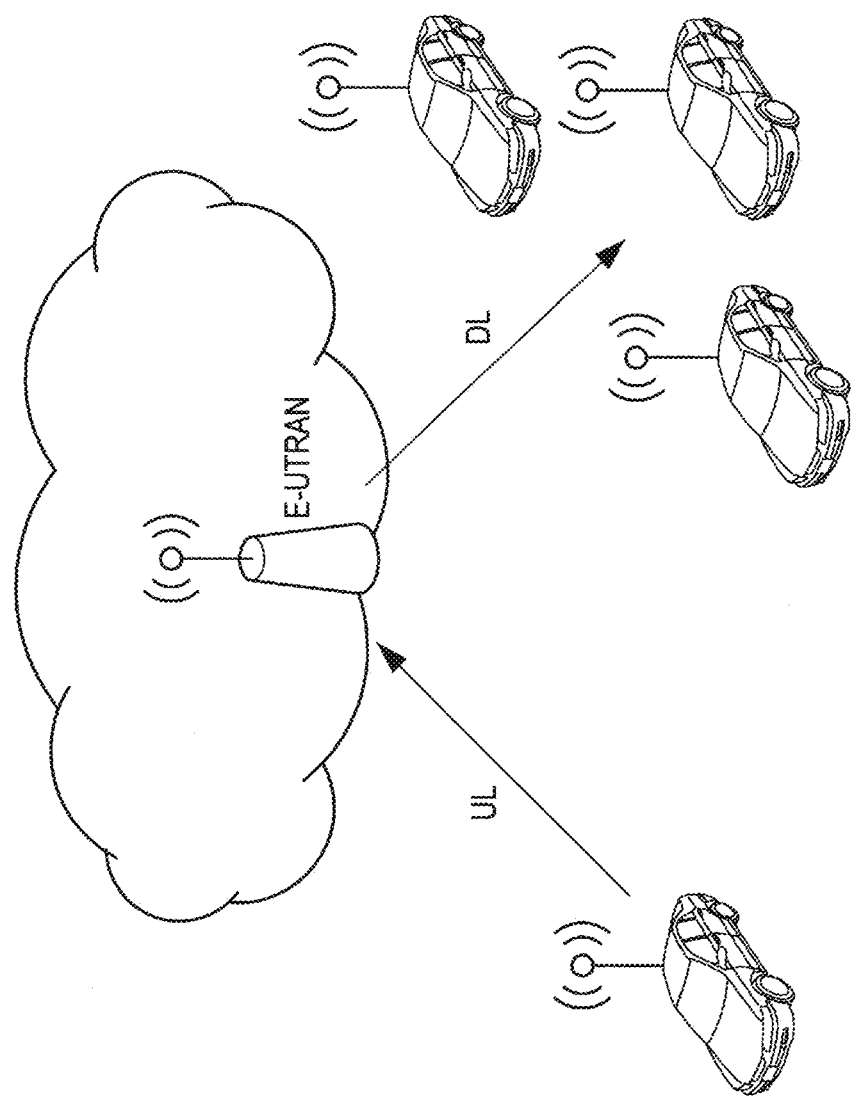
FIG. 2 is an explanatory diagram for describing a V2X operation scenario.
Figure 3:
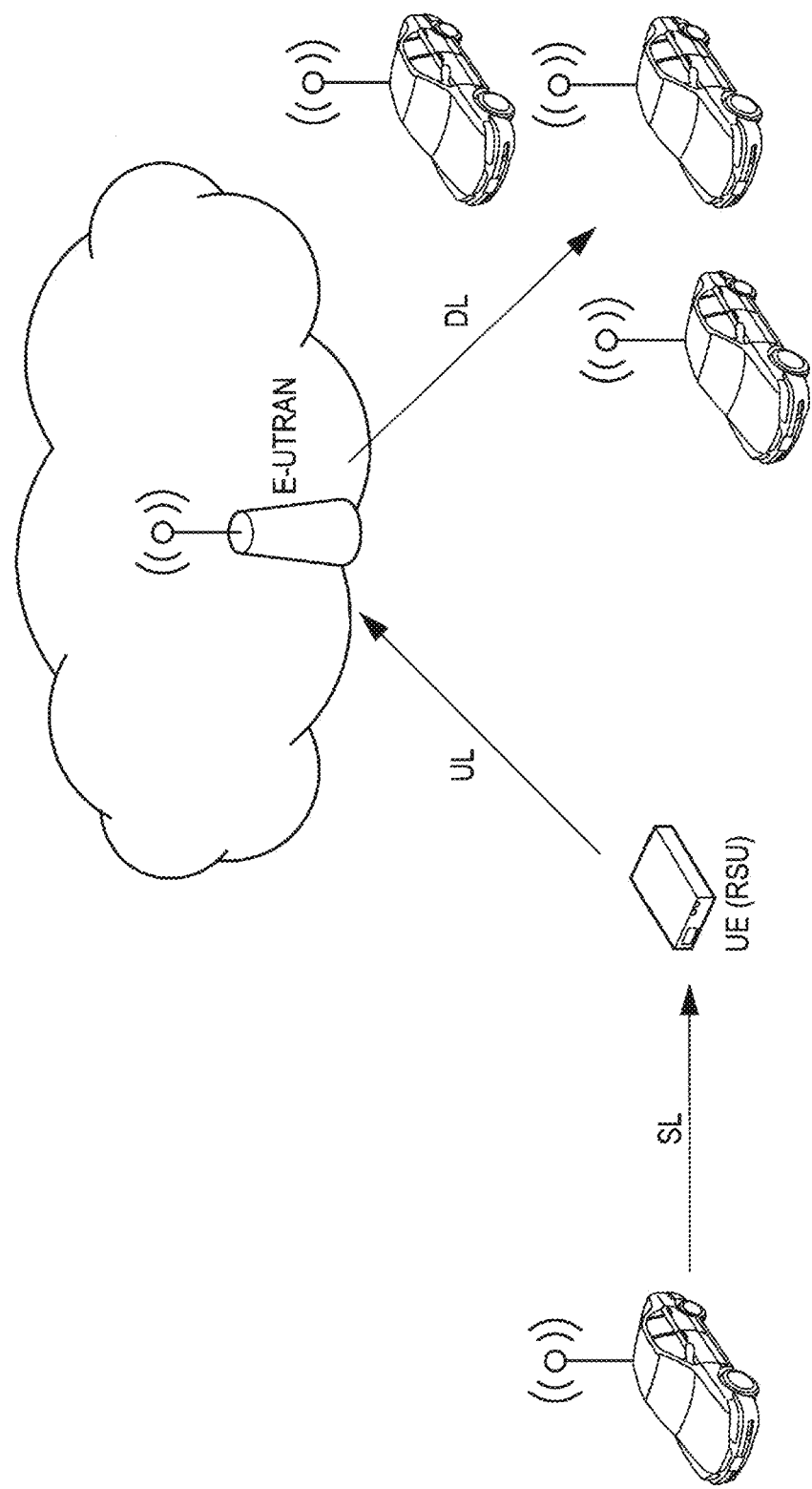
FIG. 3 is an explanatory diagram for describing a V2X operation scenario.
Figure 4:
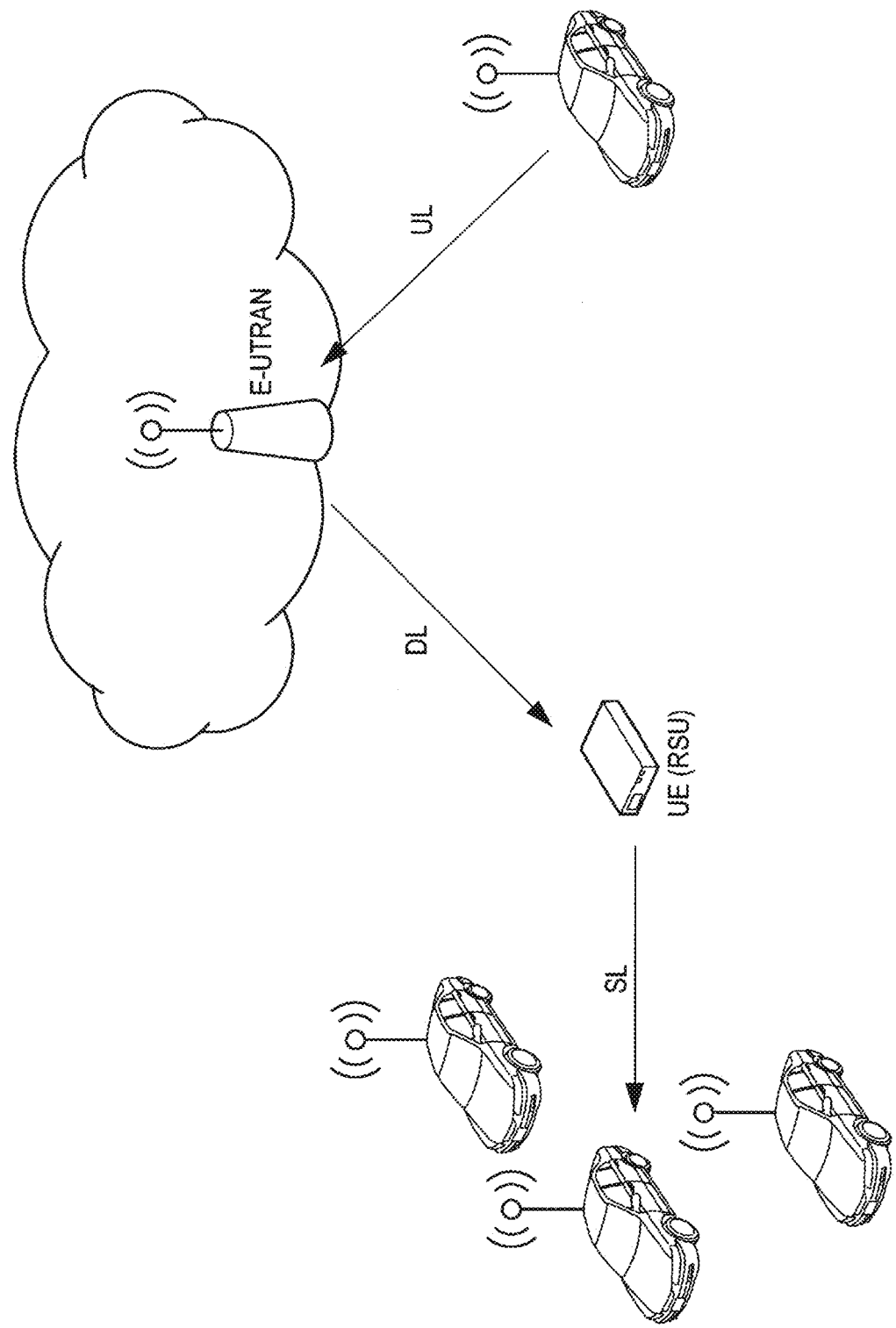
FIG. 4 is an explanatory diagram for describing a V2X operation scenario.
Figure 5:
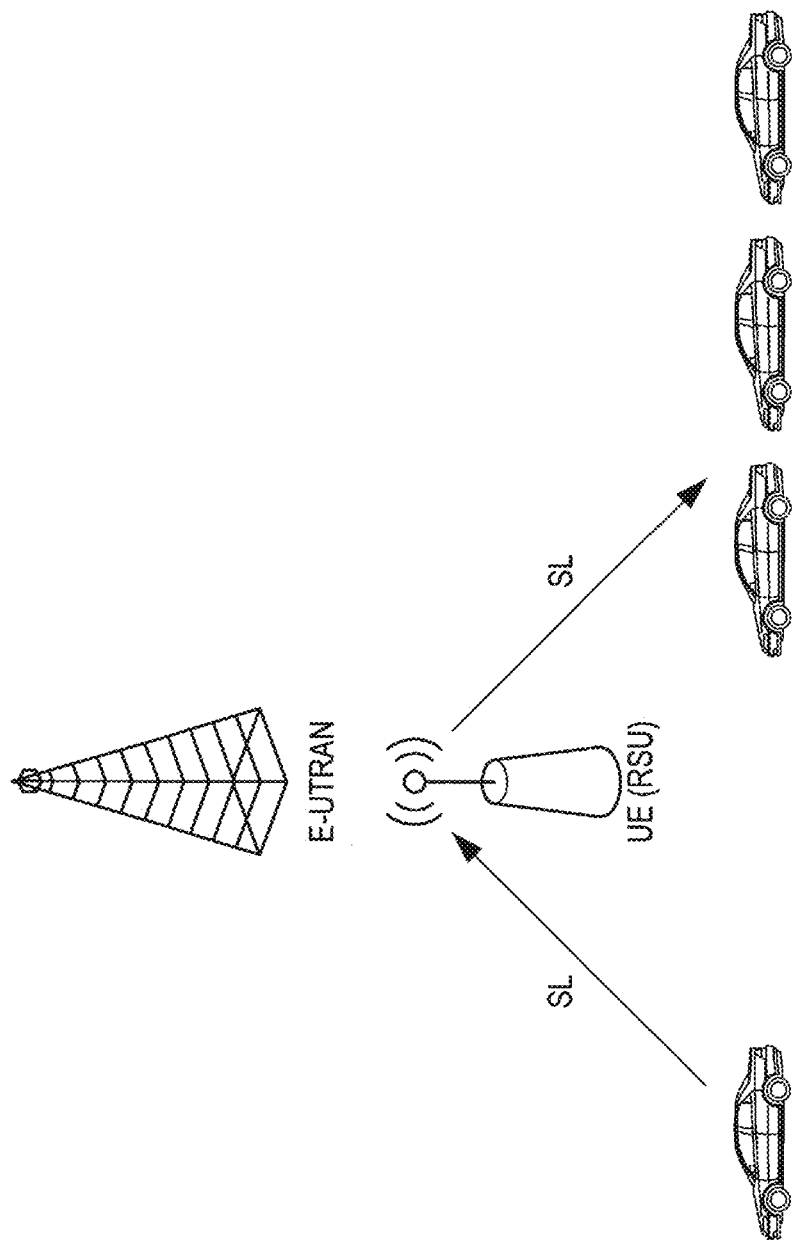
FIG. 5 is an explanatory diagram for describing a V2X operation scenario.

FIG. 1 to FIG. 5 are explanatory diagrams for describing the V2X operation scenarios. FIG. 1 illustrates a scenario in which vehicles communicate directly with each other without a base station (E-UTRAN). FIG. 2 illustrates a scenario in which vehicles communicate via a base station. FIGS. 3 and 4 illustrate a scenario in which vehicles communicate via a terminal (a UE, here, a roadside wireless device (RSU)) and a base station. FIG. 5 illustrates a scenario in which vehicles communicate via a terminal (a UE, here, a roadside wireless device (RSU)).

Since V2X communication is different from D2D in communication requirements, communication environment, or the like, the existing D2D communication is unable to be used without change. Therefore, it is necessary to enhance it to a form of adapting to V2X communication. Feature differences between D2D communication and V2X communication are illustrated below.

(1) V2X communication is high in reliability and needs low delay communication.
(2) There is traffic specific to V2X.
(3) V2X has various links.
(4) An in-band emission (IBE) problem.
(5) A half duplex (HD) problem.
(6) There is a problem in that a capacity is larger than that in D2D.
(7) Position information is consistently obtained.

First, (1) is obvious from the use cases of V2X communication. V2X communication has many safety purposes, and the reliability is a very important index. Further, since a moving speed of a vehicle is faster than that in a walking use case of D2D, implementation of low delay communication is necessary.

For the traffic specific to V2X of (2), mainly two types of traffic, that is, periodic traffic and event trigger traffic, are assumed in V2X communication. The periodic traffic is communication of periodically notifying peripheral vehicles of data, and it is also a feature of V2X.

For the various links of (3), V (vehicle)/I (infrastructure)/N (network)/P (pedestrian) are assumed as communication targets (X) of the vehicle in V2X communication. A point having such various links is also unique to V2X communication.

Figure 6:
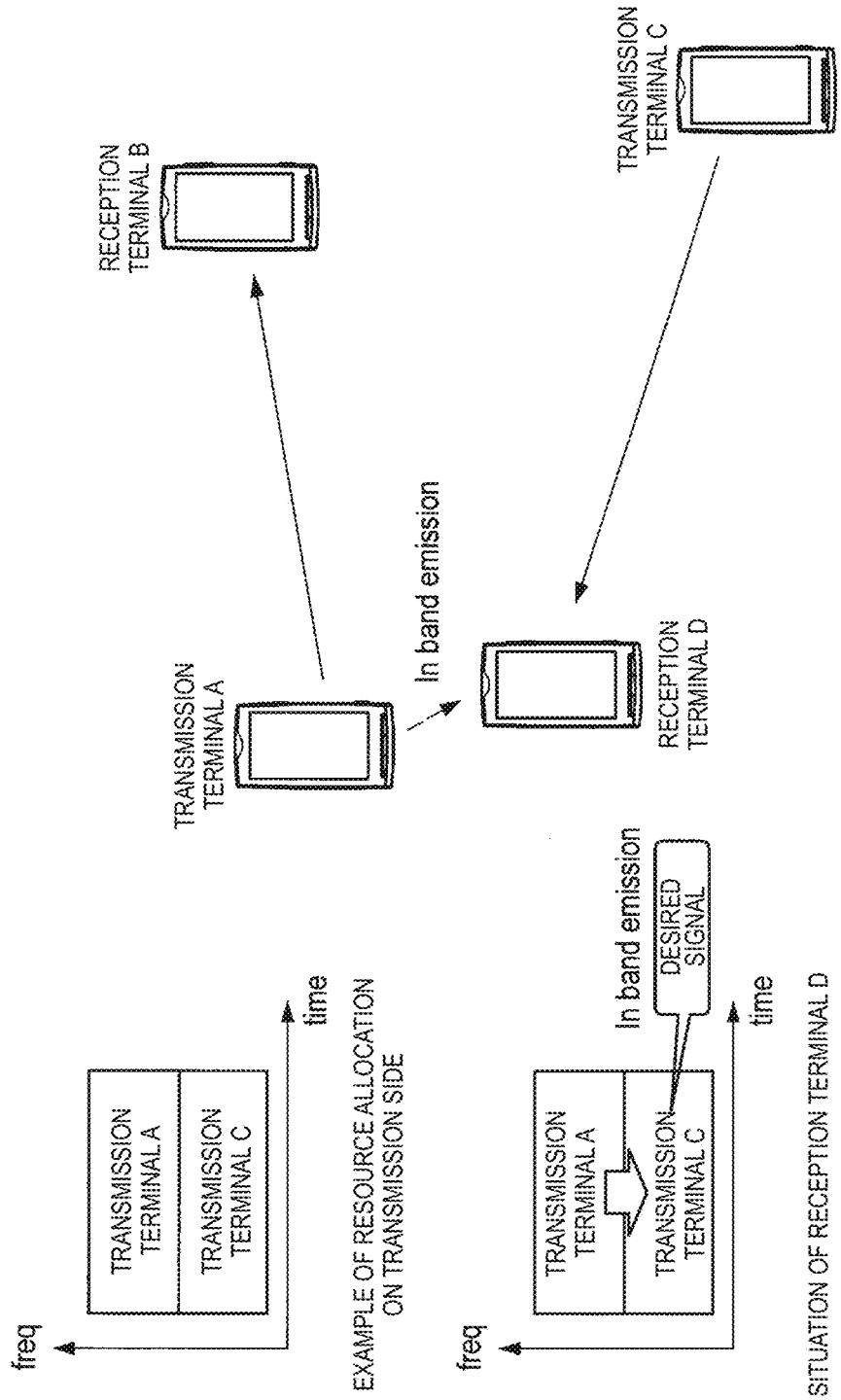
FIG. 6 is an explanatory diagram for describing an IBE.

The IBE problem of (4) and the HD problem of (5) are related to topology and RF performance of a terminal. First, the IBE will be described with reference to FIG. 6. Unlike the communication between the base station and the terminal, in the V2V communication, a position relation between a transmission terminal and a reception terminal consistently changes. In a case in which there is a reception terminal near the transmission terminal, emission from a transmission side may affect a nearby reception terminal. The orthogonality is maintained on a frequency axis, but influence of the IBE becomes remarkable from the proximity of the distance between the transmission terminal and the reception terminal. In FIG. 6, a transmission terminal A gives the IBE to a reception terminal D. As described above, in a case in which the distance between the transmission terminal and the reception terminal is short, there is a possibility of interference occurring in adjacent resources on the frequency. This problem can happen even in D2D. However, in V2X communication in which more terminals communicate than that in D2D, the IBE problem becomes more noticeable.

The HD problem of (5) refers to a problem in that the terminal is unable to perform reception while performing transmission. For this reason, it is necessary to cope with it, for example, it is necessary to prepare two or more opportunities for receiving, and it is necessary to prevent transmission of other users from being assigned in a frame for transmitting data. The HD problem is not a problem specific to V2X, but it is a big restriction in V2X communication in which it is necessary to perform much transmission and reception.

Next, the capacity of (6) will be described. As described above, in V2X communication, the number of accommodated terminals is larger than that in D2D communication. Further, as an automobile travels on the road, a terminal density inevitably increases locally. For this reason, the improvement in the capacity is indispensable in V2X communication. It is necessary to eliminate as much unnecessary overhead and the like as possible and implement efficient communication.

The reason why the position information of the last (7) can consistently be obtained is because an automobile consistently knows its position information as can be seen from a navigation system installation of an automobile in recent years. Such position information becomes a very important feature in enhancing V2X communication.

Figure 7:
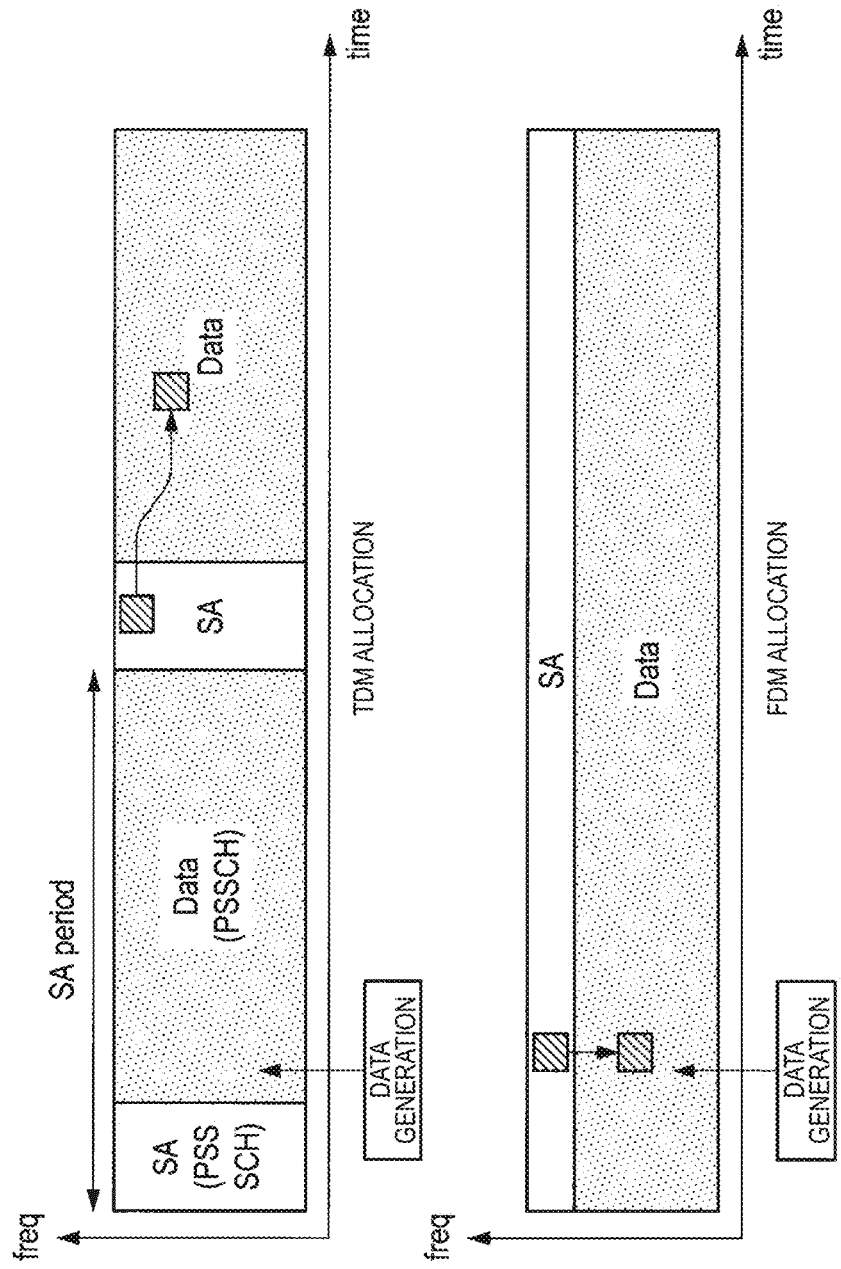
FIG. 7 is an explanatory diagram for describing TDM allocation and FDM allocation.

In order to solve these problems, a resource allocation method using frequency division multiplexing (FDM) is currently under review in 3GPP. Time division multiplexing (TDM) allocation and FDM allocation will be described with reference to FIG. 7. The PC5 interface in which D2D communication and V2X communication are performed is mainly configured with a control channel unit (physical sidelink control channel (PSCCH)) and a data channel unit (physical sidelink shared channel (PSSCH)).

Since a notification of a PSSCH resource indication or the like is performed in the PSCCH, there is a problem that a delay from generation to transmission of a packet becomes large in the TDM scheme. On the other hand, there is an advantage in that complexity of a terminal is excellent. Further, in D2D, the TDM allocation scheme is adopted. On the other hand, in the FDM scheme, since the PSCCH is mapped in the frequency direction, the delay is improved. Further, the problems of the IBE and the HD can be expected to be improved by transmitting scheduling allocation (SA) and data in the same SF (subframe). Therefore, in V2X communication, establishment of a communication method using the FDM scheme is necessary.

Figure 8:
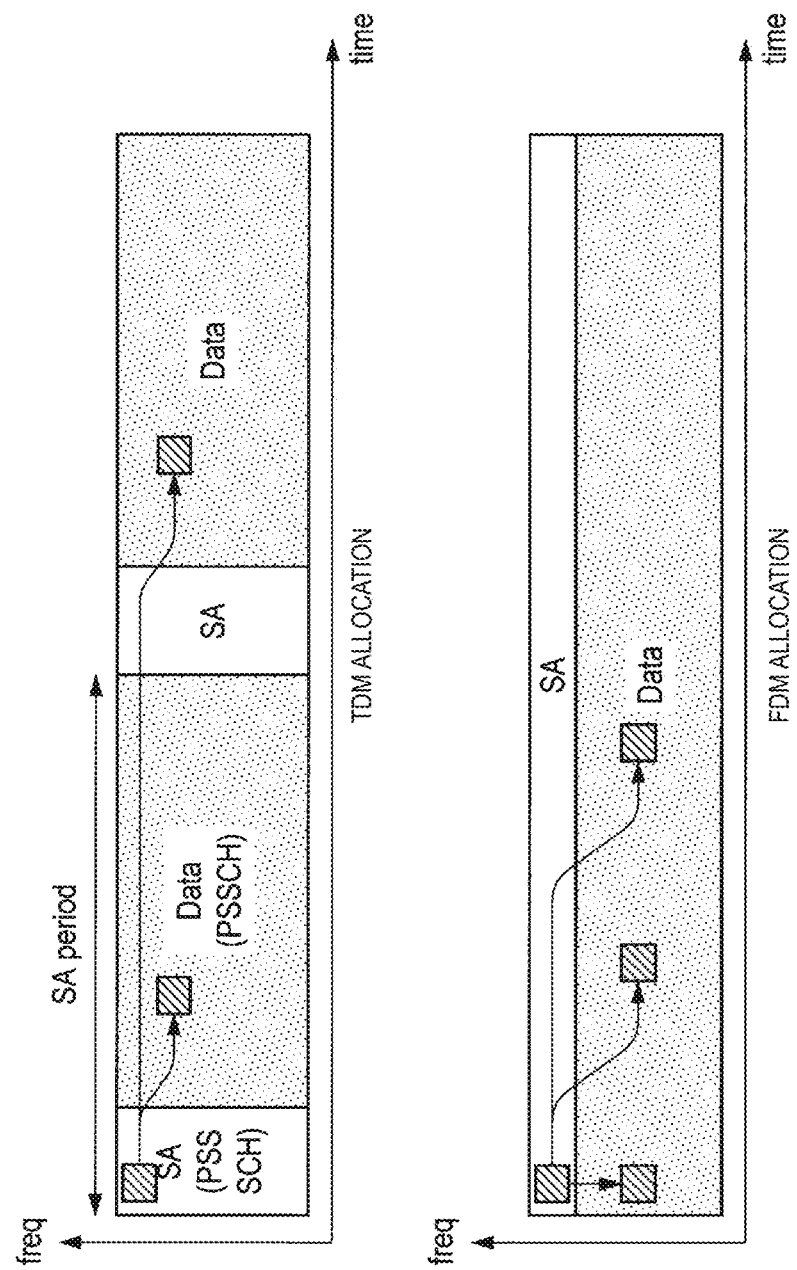
FIG. 8 is an explanatory diagram for describing an overview of SPS.
Figure 9:
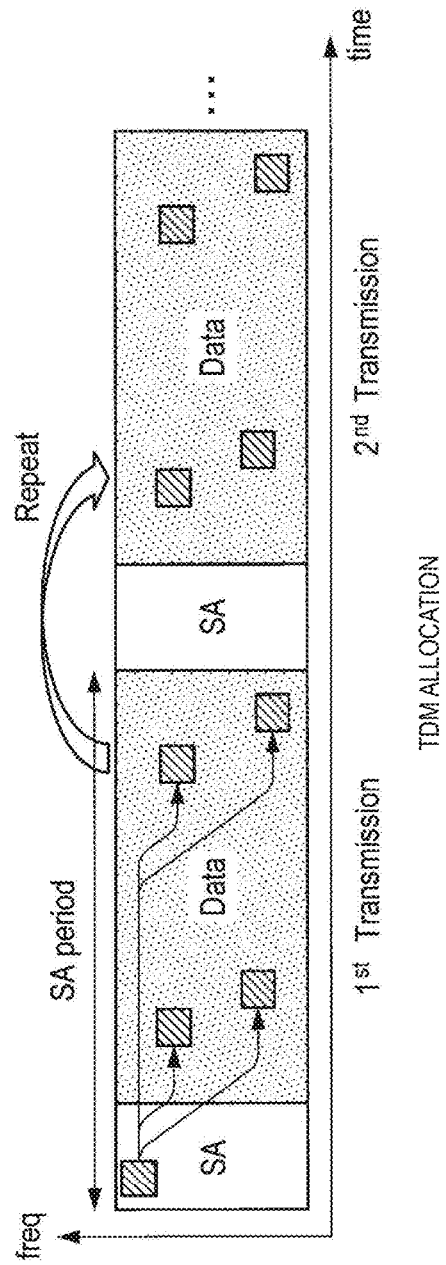
FIG. 9 is an explanatory diagram for describing an overview of SPS.
Figure 10:
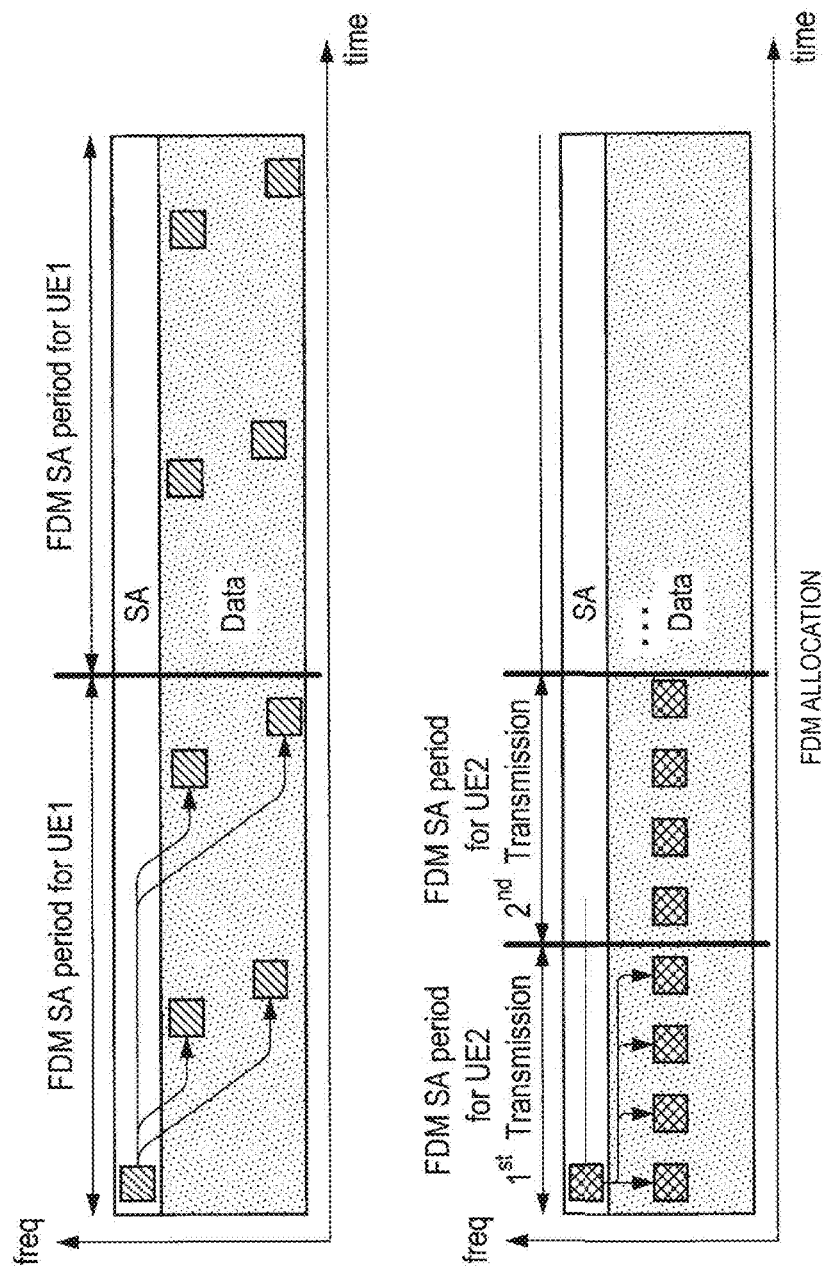
FIG. 10 is an explanatory diagram for describing an overview of SPS.

In addition to the FDM scheme, addition of further enhancement is under review as well. Introduction of semi-persistent scheduling (SPS) is also under review to solve the problem of the capacity of (6) described above. This makes good use of a characteristic of a traffic type having a feature in V2X communication. An overview of SPS is illustrated in FIGS. 8 to 10. In SPS, a plurality of pieces of data are scheduled with one SA. Therefore, it is unnecessary to transmit the SA each time data is transmitted, and the overhead can be reduced. Particularly, in the periodic communication such as the periodical traffic of V2X, it is confirmed that such scheduling produces a large effect. Therefore, introduction of SPS is also necessary in V2X communication.

As described in (6), the capacity is a big problem in V2X. Therefore, space reuse of frequency resources is under review. The position information of an automobile described in (7) is used in performing spatial reuse. Enhancement using the position information is also currently being discussed in 3GPP.

The overview of the enhancement of the PC5 interface has been described above. In V2X communication, there are two types of resource allocation, that is, centralized resource allocation of a mode 1 and autonomous resource selection of a mode 2. In the case of the mode 1, the base station performs all the resource allocation of the PC5 interface. The terminal side performs only transmission with the resources indicated to the base station. There is concern about the overhead between the base station and the terminal, but a communication characteristic is excellent because resources are allocated orthogonally. On the other hand, in the mode 2, the terminal autonomously selects resources to be used for transmission from a resource pool notified by the base station. There is no concern about overhead in the mode 1, but since there is a possibility of selecting the same resources as other terminals, a collision problem arises. The mode 2 has an advantage in that it can operate not only in-coverage which is within a network of the base station but also out-of-coverage.

Several proposals are currently being presented on this collision problem in the mode 2. The solutions can be roughly divided into two. One is energy sensing. Energy sensing is a method of sensing resources for a certain period of time and selecting communication resources from relatively unused resources on the basis of the sensing result. While it is simple, the accuracy is not that high since it is a power level. Here, it is possible to sense systems other than LTE. Another method is SA decoding. This is a method of decoding the SA (control information) transmitted by another user and recognizing a location of resources being used. The resources being used can be discovered with high accuracy, but there is a disadvantage in that sensing of SA resources is unable to be performed, and the resources being used are unable to be detected in a case in which the SA decoding fails.

In inter-device communication such as V2X communication, transmission of packets having different levels of priority has to be managed, and thus communication of packets with higher levels of priority has to be performed more reliably. Thus, how a terminal device selects resources and performs inter-device communication is very important.

Therefore, considering the above matters, the presenter of this disclosure conducted an intensity study on a technology in which resources can be efficiently selected in inter-device communication such as V2X communication. As a result, the presenter of this disclosure has devised a technology in which resources can be efficiently selected using sensing in inter-device communication such as V2X communication as will be described below.

The overview of the embodiment of the present disclosure has been described above. Next, an example of the embodiment of the present disclosure will be described in detail.

1.2. Example

First, an overview of a procedure in which a terminal device that performs inter-device communication such as V2X communication senses a resource and transmits data thereon will be described.

Figure 11:
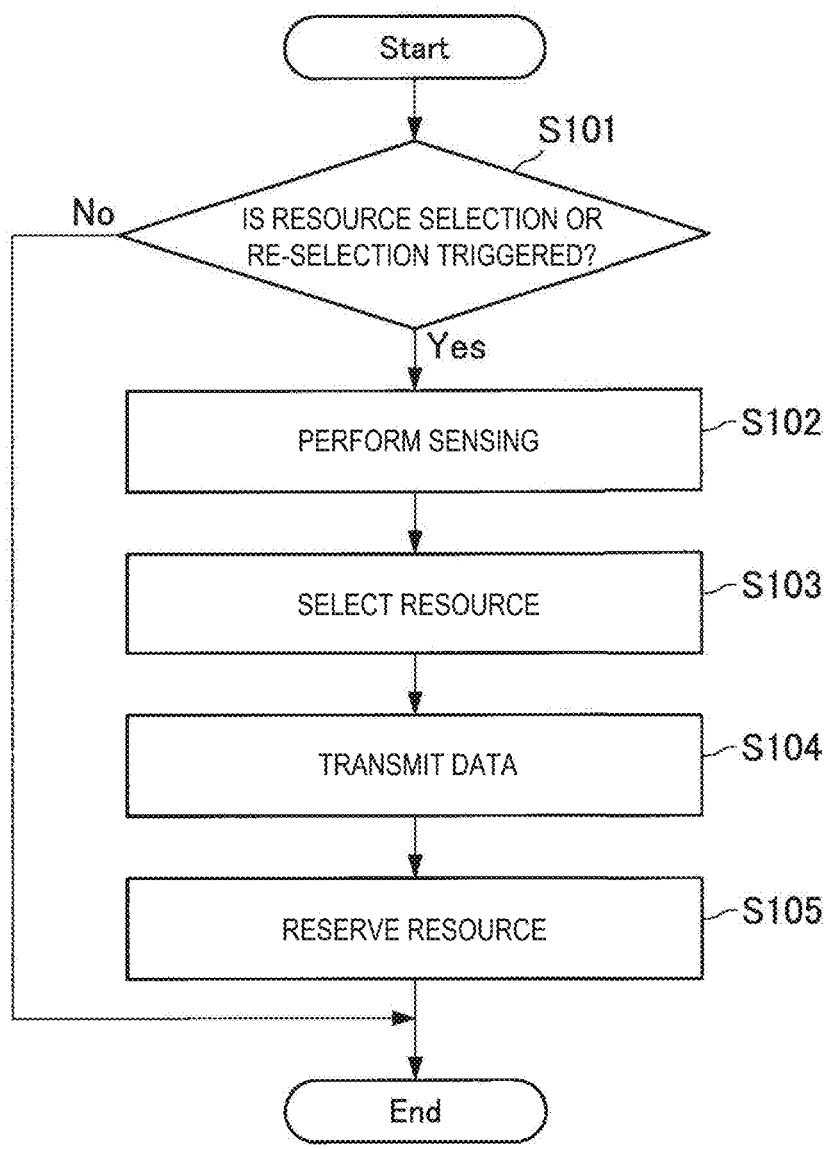
FIG. 11 is a flowchart illustrating an operation example of a terminal device according to an embodiment of the present disclosure.

FIG. 11 is a flowchart illustrating an operation example of a terminal device according to an embodiment of the present disclosure. FIG. 11 illustrates a flowchart showing the overview of the procedure in which the terminal device performing inter-device communication senses a resource and transmits data thereon. The operation example of the terminal device according to the embodiment of the present disclosure will be described below using FIG. 11.

The terminal device determines whether to drive the following process of resources selection and reselection in accordance with a trigger (Step S101). The trigger mentioned here can be various things, for example, a time at which a transmission packet is generated, a time at which a resource collision is detected, and the like. Detailed thereof will be described below.

In a case in which driving the process of resource selection and reselection is determined (Yes in Step S101), the terminal device then executes sensing with respect to a resource area allocated by a base station (Step S102). Sensing methods include SA decoding and energy sensing. The terminal device recognizes a wireless communication environment using such a sensing method. Then, the terminal device selects a resource to be used in transmission of data in the resource area on the basis of the sensing result (Step S103).

When the resource to be used in transmission of data is selected, the terminal device then executes data transmission using the selected resource (Step S104). The terminal device may execute reservation of a resource to be used in the future if necessary, in addition to execution of data transmission (Step S105). The order of execution of data transmission and execution of resource reservation may be reversed.

Note that, although the above-described communication method using a series of sensing is on the assumption of SPS, it may be adopted to dynamic scheduling.

The overview of the procedure in which the terminal device senses a resource and transmits data has been described above. Next, each of the above-described processes will be described in detail.

(1. Trigger)
(1-1. Trigger for reselection of resource)

First, the trigger of Step S101 of FIG. 11 will be described in detail. In the case of SPS, it is fundamental for the terminal device to continue to use a once secured resource. Thus, any trigger is necessary when a resource is selected again (reselection). Here, a trigger condition will be described.

(1) Counter

The terminal device may set, for example, a case in which a counter value set for reselection of a resource becomes 0 as a trigger condition. The counter value may be set for the terminal device, for example, using a random number. The random number may be notified by a base station through SIB or RRC signaling, or may be set in the terminal device in advance. In a case in which a base station notifies the terminal device of a random number, the base station may notify the terminal device of the random value itself or a seed of the random number. In addition, in the case in which the base station notifies the terminal device of a random number, the base station may notify the terminal device of a random value or a seed of the random number commonly for cells, or decide and notify the terminal device of a value for each terminal device.

The terminal device may subtract the counter value, for example, each time the time of a subframe or slot elapses, or subtract the counter value for each sensed subframe or slot. In addition, the terminal device may subtract the counter value for each amount of traffic to be transmitted. In this case, the terminal device may increase the amount of subtraction in a case in which traffic with a high level of priority is retained. Threshold value information for quantizing the traffic amount may be notified by the base station through SIB or RRC signaling. A threshold value may be set for each terminal device or each cell. In addition, a threshold value may be set for each traffic type. In addition, a threshold value may be set in the terminal device in advance.

In addition, the terminal device may subtract the counter value using a gap between the size of the resource being used and the size of a resource actually necessary for meeting communication requirements. The gap between the sizes of the two resources may be quantized, and the terminal device then may divide the quantized gap into a plurality of levels and subtract the counter value in accordance with the levels. Threshold value information for quantization may be notified by the base station through SIB or RRC signaling. A threshold value may be set for each terminal device or each cell. In addition, a threshold value may be set for each traffic type. In addition, a threshold value may be set in the terminal device in advance.

In addition, the terminal device may subtract the counter value each time a transmission right is acquired. For example, in a case in which a transmission right is acquired by performing sensing, the terminal device may only execute subtraction without performing transmission. Threshold value information used in acquiring a transmission right may be notified by the base station through SIB or RRC signaling. A threshold value may be set for each terminal device or each cell. In addition, a threshold value may be set for each traffic type. In addition, a threshold value may be set in the terminal device in advance.

In addition, in a case in which a subtraction amount of a counter value is notified directly by a base station, a peripheral terminal, or an RSU, the terminal device may subtract the amount instructed from the base station, the peripheral terminal, or the RSU. This also includes forcedly subtracting the counter value to be 0. The subtraction amount of the counter value can be notified by the base station through, for example, RRC signaling. The subtraction amount of the counter value can be notified by the peripheral terminal using SCI or a PSSCH.

In addition, the terminal device may subtract the counter value in accordance with a traffic amount of sidelink. The terminal device may ascertain the traffic amount using an amount of data reception from the peripheral terminal, or may ascertain the traffic amount on the basis of a notification of the traffic amount from the base station. Threshold value information of the traffic amount may be notified by the base station through SIB or RRC signaling. A threshold value may be set for each terminal device or each cell. In addition, a threshold value may be set for each traffic type. In addition, a threshold value may be set in the terminal device in advance.

(2) Resource Allocation Situation does not Meet Requirements of Terminal Device

The terminal device may set a case in which a resource allocation situation does not meet requirements of the terminal device as a trigger condition. The requirements of the terminal device can be, for example, a delay request, reliability, fairness, QoS, and the like.

As the resource allocation situation, the terminal device may use a gap between the size of the resource to be used and the size of a resource actually necessary for meeting communication requirements. The gap between the sizes of the two resources may be quantized, and the terminal device then may divide the quantized gap into a plurality of levels and determine a resource allocation situation in accordance with the levels. Threshold value information for quantization may be notified by the base station through SIB or RRC signaling. A threshold value may be set for each terminal device or each cell. In addition, a threshold value may be set for each traffic type. In addition, a threshold value may be set in the terminal device in advance.

(3) Case in which the Terminal Device Discovers Collision of Resources (Overlap of Resources with Another User) in Future Transmission The terminal device may set a case in which the terminal device discovers a collision of resources (overlap of resources with another user) in future transmission as a trigger condition. The terminal device may perform, for example, SA decoding, ascertain a resource allocation situation, and discover whether there is an overlap with transmission of the terminal device.

In this case, for example, the terminal device may execute reselection if the number of collisions occurring is greater than or equal to a threshold value. The number of collisions occurring may be set for each transport block or each repetition. Threshold value information may be notified by the base station through SIB or RRC signaling. A threshold value may be set for each terminal device or each cell. In addition, a threshold value may be set for each traffic type. In addition, a threshold value may be set in the terminal device in advance.

(4) Base Station Gives Notification of Reselection

The terminal device may set a case in which a base station gives notification of reselection as a trigger condition.

The base station may determine, for example, whether reselection is necessary on the basis of a level of congestion of traffic (a resource use ratio). In this case, the base station may monitor resources of sidelink or receive notification of sidelink traffic information from the terminal device. The terminal device may set a notification method for traffic information through SIB or RRC signaling from the base station.

In addition, the base station may determine whether reselection is necessary on the basis of, for example, a resource use situation (a time, the number of transmission operations, and a transmission traffic amount) of a specific terminal. In this case, the terminal device may periodically notify the base station of the resource use situation. The terminal device may set a notification method of a resource use situation through SIB or RRC signaling from the base station.

(5) Notifying Release of Resource by Another Terminal Device

The terminal device may set a case in which another terminal device gives notification of release of a resource as a trigger condition. In this case, the terminal device may execute reselection in a case in which a notification of release of a resource from another terminal device exceeds a threshold value. The notification of release of a resource from the other terminal device is transmitted in, for example, SCI. Threshold value information may be notified by the base station through SIB or RRC signaling. A threshold value may be set for each terminal device or each cell. In addition, a threshold value may be set for each traffic type. In addition, a threshold value may be set in the terminal device in advance.

(6) Notifying Collision Report from Another Terminal Device

The terminal device may set a case in which another terminal device gives notification of a collision report as a trigger condition. In this case, the terminal device may execute reselection in a case in which the notification of a collision report from the other terminal device exceeds a threshold value. The notification of the collision report from the other terminal device is transmitted in, for example, SCI. Threshold value information may be notified by the base station through SIB or RRC signaling. A threshold value may be set for each terminal device or each cell. In addition, a threshold value may be set for each traffic type. In addition, a threshold value may be set in the terminal device in advance.

(7) Congestion of Sidelink

The terminal device may set a case in which sidelink is congested as a trigger condition. In this case, the terminal device may execute reselection in a case in which the level of congestion of the sidelink exceeds a predetermined threshold value. Note that the level of congestion of the sidelink may be measured by the terminal device or by the base station. Threshold value information may be notified by the base station through SIB or RRC signaling. A threshold value may be set for each terminal device or each cell. In addition, a threshold value may be set for each traffic type. In addition, a threshold value may be set in the terminal device in advance.

The trigger conditions have been introduced by exemplifying the seven examples from (1) to (7) above. The terminal device may use these trigger conditions singly or in a combination of a plurality of trigger conditions.

When the above-described trigger conditions are satisfied, the terminal device executes reselection of a resource. At the time of selection of a resource, the terminal device may execute resource allocation using position information in order to minimize influence of IBE. By including position information or zone information of a position of the terminal device transmitting data in SA, the terminal device can detect the presence of a nearby terminal device and it is possible to perform an operation of transmitting a signal using the same subframes as much as possible to the nearby terminal device. The transmission of a signal using the same subframes as much as possible to the nearby terminal device leads to amelioration of the above-described IBE problem.

(1-2. Prevention of Divergence Caused by Occurrence of Large Amount of Reselection)

The terminal device can execute reselection under the above-described trigger conditions. However, when a large amount of reselection occurs in every terminal device, resources used by the terminal devices frequently change, which makes sensing meaningless. As a result, the communication system becomes unstable. Method for preventing such divergence will be described.

(1) Control Divergence from System Side

For example, the terminal device may determine whether reselection should be really performed using a probability $\alpha$ after the above-described trigger condition for reselection is satisfied. The probability $\alpha$ may be notified by the base station through SIB or RRC signaling. The probability $\alpha$ may be set for each terminal device or each cell. In addition, the probability $\alpha$ may be set for each traffic type. In addition, the probability $\alpha$ may be set in the terminal device in advance.

In addition, for example, the terminal device may determine whether a newly selected resource is to be used or a previous resource is to be used using a probability $\beta$ after the above-described trigger condition for reselection is satisfied and reselection is executed. The probability $\beta$ may be notified by the base station through SIB or RRC signaling. The probability $\beta$ may be set for each terminal device or each cell. In addition, the probability $\beta$ may be set for each traffic type. In addition, the probability $\beta$ may be set in the terminal device in advance. The probability $\beta$ may be the same as or different from the probability $\alpha$.

In addition, for example, the terminal device may uniformly increase the threshold values used in the above-described trigger conditions for reselection. Signaling for correction of the threshold values is notified by the base station through SIB or RRC signaling. The terminal device may be notified of the increase amount or the increase rate by the base station in advance or have the increase amount or the increase rate set in advance. In addition, the terminal device may receive an instruction for activation and cancellation of the increase of the threshold values from the base station.

(2) Base Station Ascertains the Extent of Reselection that Occurred in System

For example, after executing reselection, the terminal device may report the fact that reselection has been executed to the base station. The terminal device may set the reporting method through SIB or RRC signaling from the base station.

In this case, if all terminal devices provide the report to the base station each time of reselection, overhead can increase. Thus, after executing reselection, the terminal device may report the fact that reselection has been executed to the base station with a probability γ. The probability γ may be reported through SIB or RRC signaling from the base station. The probability γ may be set for each terminal device or each cell. In addition, the probability γ may be set for each traffic type. In addition, the probability γ may be set in the terminal device in advance. The probability γ may be the same as or different from the probability α and/or the probability β.

(2. Sensing, Data Transmission, and Resource Reservation)
(2-1. Restriction on Sensing Area)

In order to reduce power consumption of the terminal device, it is desirable to restrict a sensing area in which a resource area is sensed. Hereinbelow, a way of defining a sensing area for the terminal device, data transmission after sensing in a sensing area, and a way of defining resource reservation will be described.

Figure 12:
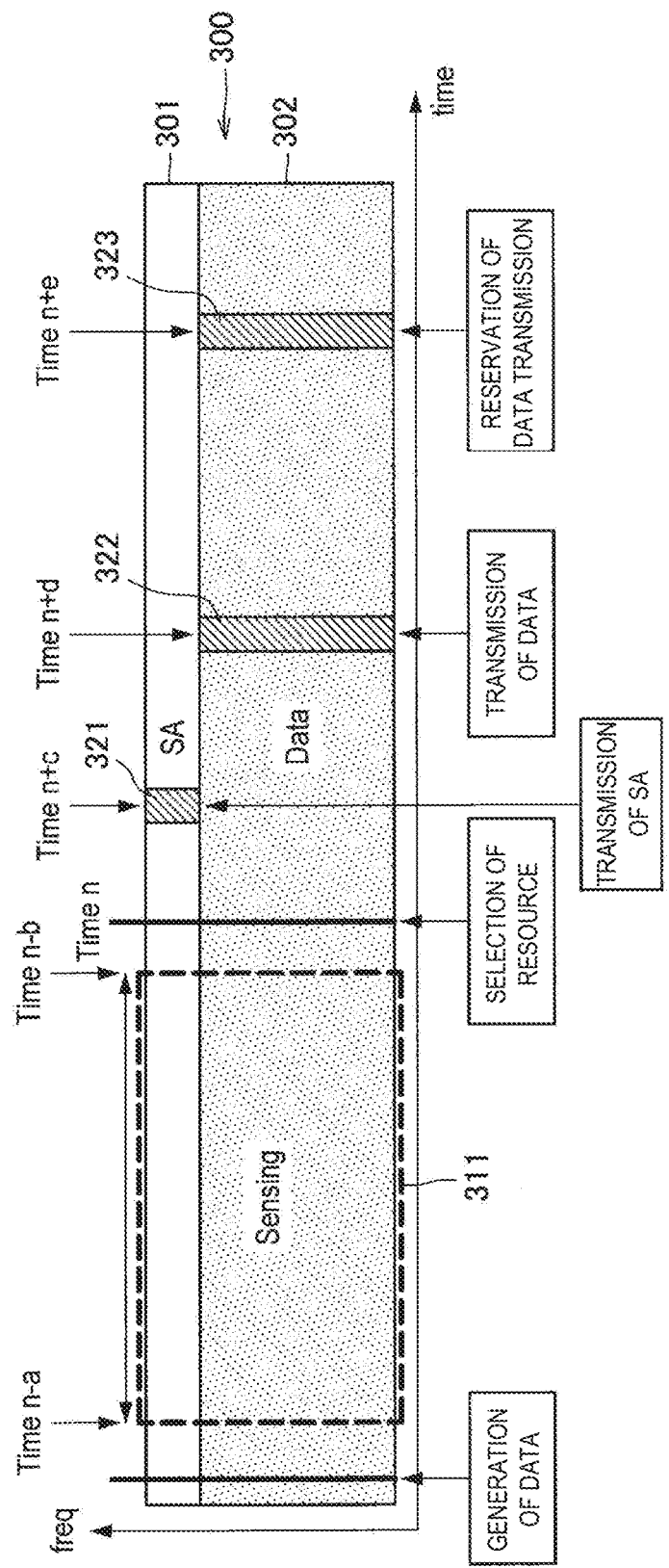
FIG. 12 is an explanatory diagram for describing occurrence of transmission data to data transmission reservation of the terminal device.

FIG. 12 is an explanatory diagram for describing occurrence of transmission data to data transmission reservation of the terminal device. A resource area 300 includes an SA resource 301 and a data resource 302.

When transmission data is generated in the terminal device at a certain timing, the terminal device performs sensing in a sensing area 311 including a section of a time n-a to a time n-b. The terminal device uses SA sensing and/or energy sensing as sensing. The terminal device performs resource selection at a time n after performing sensing in the sensing area 311. The terminal device performs resource selection for both the SA resource 301 and the data resource 302.

After performing resource selection at the time n, the terminal device then performs transmission of SA using a resource 321 of the SA resource 301 at a time n+c, and performs transmission of data using a resource 322 of the data resource 302 at a time n+d. Furthermore, the terminal device reserves a resource 323 of the data resource 302 for future data transmission (at a time n+e).

Note that each of the parameters from a to e shown in FIG. 12 has a positive value. Each of the parameters from a to e shown in FIG. 12 may be set for each SPS. In addition, each of the parameters from a to e shown in FIG. 12 may be set commonly for SPS.

Since the series of processes illustrated in FIG. 12 are executed by the terminal device, it is necessary to set each of the parameters from a to e for the terminal device.

(1) Parameters a and b

While the parameters a and b significantly affect accuracy in sensing by the terminal device, it is desirable to appropriately set the parameters because a delay requirement is not satisfied when a sensing period becomes long.

In the present embodiment, the base station sets a value for the terminal device with preparation of a setting of a plurality of sets of (a, b). The settings are, for example, Configuration 1 (a1, b1), Configuration 2 (a2, b2), and the like. A plurality of settings may be set in the terminal device in advance.

A configuration may be set for each traffic type, or each level of priority of traffic. In addition, each configuration may be set in accordance with a movement speed of the terminal device, or the type of the terminal device (a pedestrian UE being used by a pedestrian, a vehicle UE mounted in a vehicle, etc.), position information of the terminal device (a resource pool being used by the terminal device), or the like. In addition, each configuration may be set in accordance with a use situation of resources on sidelink, for example, a use ratio of resources on sidelink. Each configuration may be common between terminal devices or may be set for each terminal device. In addition, each configuration may be common between terminal devices or may be set for each terminal device.

In a case of a message that is likely to include a latency request such as an event trigger message, for example, a sensing time of the terminal device can be reduced and a delay until transmission can be reduced by allocating a configuration in which a sensing window of the sensing area 311 is likely to decrease to the terminal device.

In addition, there may be a case in which, for example, it is not possible for the terminal device with a high movement speed to correctly predict a wireless communication environment when transmission is actually performed even if the measurement is performed in a long sensing time because the wireless communication environment changes fast. Thus, a configuration in which the sensing window of the sensing area 311 is likely to decrease may be assigned to a terminal device with a high movement speed.

In addition, also in a case in which Configuration is allocated to each terminal device, for example, it is desirable to set the sensing window of the sensing area 311 to decrease with respect to a terminal device requesting a reduction in power consumption such as a pedestrian UE. On the other hand, an enlarged sensing window of the sensing area 311 may be set for a terminal device performing V2V communication with a sufficient battery capacity.

Note that, in a case in which Configuration from the base station is set, the terminal device may set the Configuration through SIB or RRC signaling from the base station. In addition, Configuration may be set in the terminal device in advance.

In SPS, prediction of future resource use situation using SA decoding is effective. Meanwhile, there is a case in which a transmission terminal is unable to perform SA decoding, like a case in which sensing is started immediately after transmission of SA by another terminal, or the like. In addition, there can be cases in which SA decoding fails. In such a case it is difficult for the terminal device to predict a future resource use situation.

In order to maximize benefits of sensing, how the terminal device predicts a future resource use situation from sensing results is important. Thus, if an environment in which a correlation between a sensing area and a resource use situation of a data transmission area is likely to be high can be realized, the terminal device can predict a future resource use situation from a situation of the sensing area with high accuracy.

Figure 13:
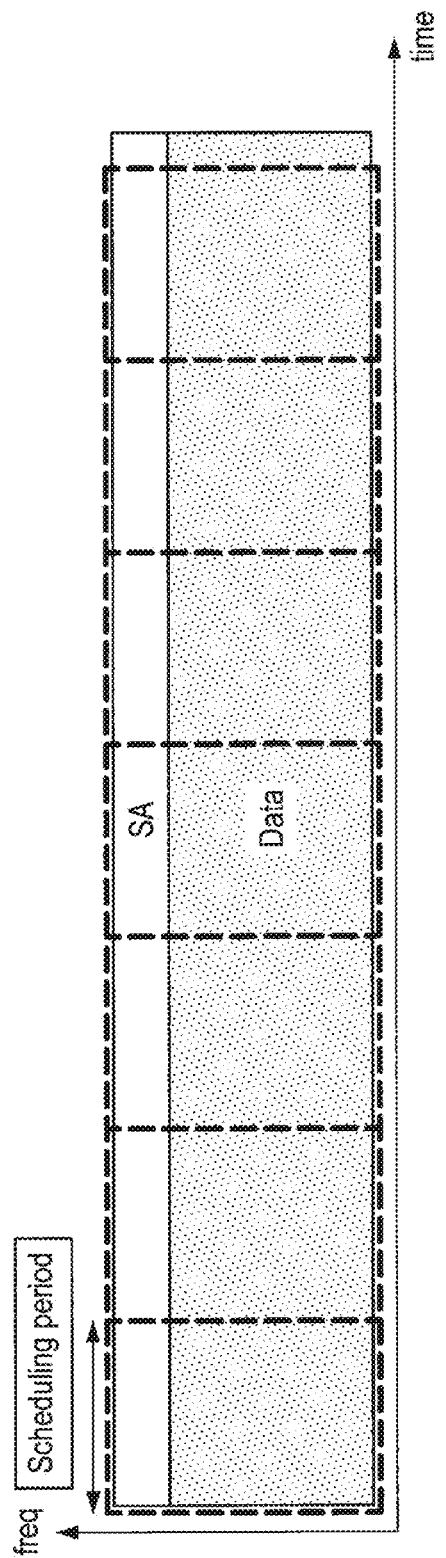
FIG. 13 is an explanatory diagram illustrating an example of scheduling periods introduced in a resource pool.

Therefore, scheduling periods are introduced to a resource pool in the present embodiment. FIG. 13 is an explanatory diagram illustrating an example of scheduling periods. A scheduling period is provided for each resource pool.

Figure 14:
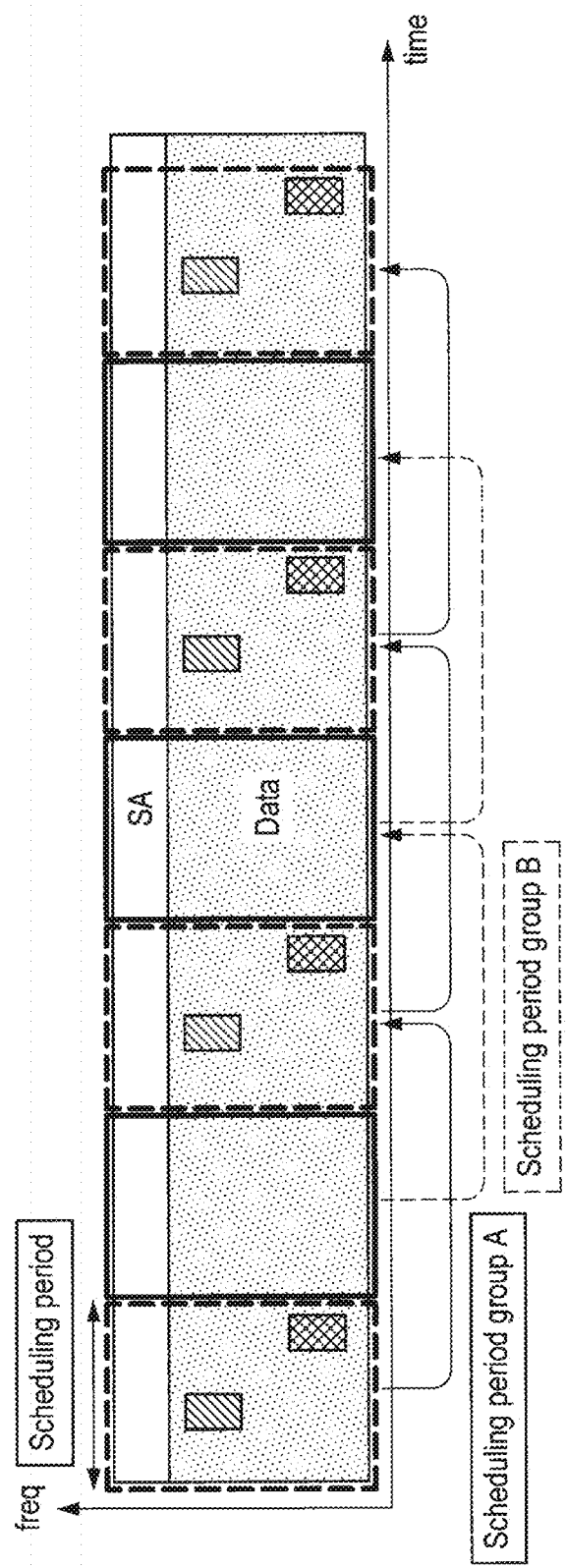
FIG. 14 is an explanatory diagram illustrating an example of grouped scheduling periods.

In addition, grouping is performed in units of scheduling periods in the present embodiment. This grouping is set for each resource pool. Each of groups may be set in accordance with geographic information. FIG. 14 is an explanatory diagram illustrating an example of grouped scheduling periods. FIG. 14 shows an example of grouping every other scheduling period. Of course, a pattern of grouping scheduling periods is not limited to that illustrated in FIG. 14.

The terminal device selects one group from a plurality of scheduling period groups and performs transmission. At this time, it is desirable to manage the group such that a correlation of resource uses between each of the scheduling periods is high.

Figure 15:
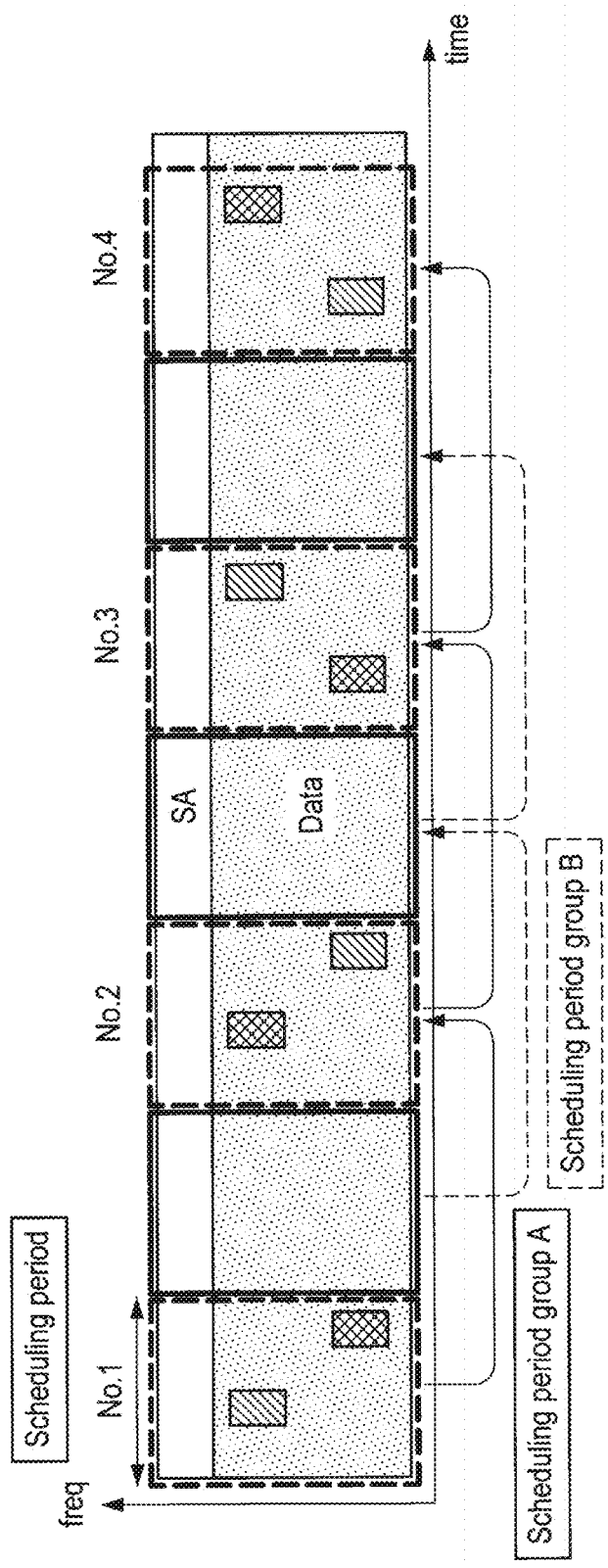
FIG. 15 is an explanatory diagram illustrating an example in which the terminal device performs resource hopping in accordance with the numbers of scheduling periods.

Numbering may be performed in scheduling periods within a group of each of the scheduling periods. Then, the terminal device may execute resource hopping and the like in accordance with the numbers of the scheduling periods. FIG. 15 is an explanatory diagram illustrating an example in which the terminal device performs resource hopping in accordance with the numbers of scheduling periods. Of course, a pattern of hopping is not limited to that illustrated in FIG. 15.

In a case in which parameters for resource hopping from the base station are set, the terminal device may set the parameters through SIB or RRC signaling from the base station. In addition, the parameters may be set in the terminal device in advance.

In addition, information regarding the scheduling periods, the groups of the scheduling periods, and the numbers of the scheduling periods may be set through SIB or RRC signaling from the base station. In addition, the parameters a to e shown in FIG. 12 may be calculated on the basis of intervals of the scheduling periods.

(2) Parameters c and d

The parameters c and d are parameters affecting a transmission delay. The parameter c may be set for each traffic type or for each level of priority of traffic. In addition, the parameter c may be set in accordance with a movement speed of the terminal device, the type of the terminal device (the pedestrian UE, the vehicle UE, etc.), position information of the terminal device, or the like. In addition, the parameter c may be set commonly for terminal devices or set for each terminal device.

The parameter d may have different values set for each of terminal devices, or may be common for the terminal devices. In addition, the parameter d may be the same value as the parameter c.

In a case in which the parameters c and d are set by the base station, the parameters are set for the terminal device via SIB or RRC signaling from the base station. In addition, the parameters c and d may bet for the terminal device in advance.

(3) Parameter e

The terminal device not only can decide data for transmission but also can secure a resource to be used in the future on the basis of a sensing result. In the case in which a resource is also secured, a method of notifying a nearby terminal device of resource reservation information (i.e., information regarding the parameter e) is necessary.

The terminal device may notify a nearby terminal device of resource reservation information using, for example, SCI. Specifically, the terminal device may include information of the parameter e in SCI and notify the nearby terminal device of the information. When the information of the parameter e is included, the terminal device may also include a frequency direction therein. In addition, the terminal device may also include the number of resource reservations with the parameter e in the SCI. In addition, the terminal device may give an instruction of a place of the reserved resource using a bitmap. In addition, the terminal device may also include information of a frequency hopping pattern in the SCI. In addition, the hopping pattern to be used is set through DCI, SIB, or RRC signaling from the base station. In addition, the hopping pattern to be used may be set in the terminal device in advance.

In addition, for example, the terminal device may elicit the parameter e from a method of allocating an SA resource and a data resource and notify a nearby terminal device of the parameter. For example, the terminal device may elicit the parameter e using a time interval or a frequency interval of repetition of the SA resource or the data resource and notify a nearby terminal of the parameter e.

In addition, the terminal device may elicit the parameter e using a time offset or a frequency offset of the SA resource and the data resource and notify a nearby terminal device of the parameter e.

In addition, the nearby terminal device may infer a resource reservation place from a place at which the SA resource or the data resource is allocated. In a case in which the SA resource or the data resource is allocated to a time domain or a frequency domain determined in advance, for example, the nearby terminal device may determine that the resource has been reserved. The time domain or the frequency domain determined in advance may be notified by the base station.

In addition, the terminal device may notify the nearby terminal device of information of the resource reservation using an indicator of mapping information (a time resource pattern defined in D2D) of repetition of the SA resource or the data resource. In a case in which information of the time resource pattern exceeds a defined threshold value, the nearby terminal device may determine that resource reservation has been made by another terminal device. The number of threshold values may be plural, and the threshold value may be notified of through SIB or RRC signaling from the base station, or set in the terminal device in advance.

The terminal device performs resource selection after sensing, however, there are cases in which no resources are secured due to traffic congestion or the like at the time of resource selection. In this case, there is concern of resource selection by the terminal device being delayed and a correlation between the result of sensing performed in the past and a resource to be selected being lower.

Therefore, in the case in which no resources are secured at the time of resource selection, the terminal device may prolong the sensing period until a resource can be selected. That is, it is a period in which a resource selection timing is from n to n1, and the sensing window is from n−a to n1−b.

If sensing is continued long, however, there is a possibility of past sensing information adversely affecting resource selection. Thus, in a case in which the value of n1−n is higher than or equal to a threshold value, for example, the terminal device may give up resource selection and transition to a resource reselection phase. Threshold value information at this time may be notified to the terminal device through SIB or RRC signaling from the base station. The threshold value may be set for each terminal device or each cell, or for each traffic type. In addition, the threshold value may be set in the terminal device in advance.

In addition, in a case in which no resource can be secured at the time of resource selection, the terminal device may slide the sensing window until a resource can be selected. That is, it is a period in which a resource selection timing is from n to n1, and the sensing window is from n1−a to n1−b.

In a case in which a plurality of pieces of SPS are set, it is important how a sensing section is maintained or how sensing is performed efficiently.

In a case in which a plurality of pieces of SPS are used, the parameters a to e are defined for each piece of SPS. Parameters a_com and b_com for defining a common sensing area are set for the parameters a and b for defining a sensing area.

Figure 16:
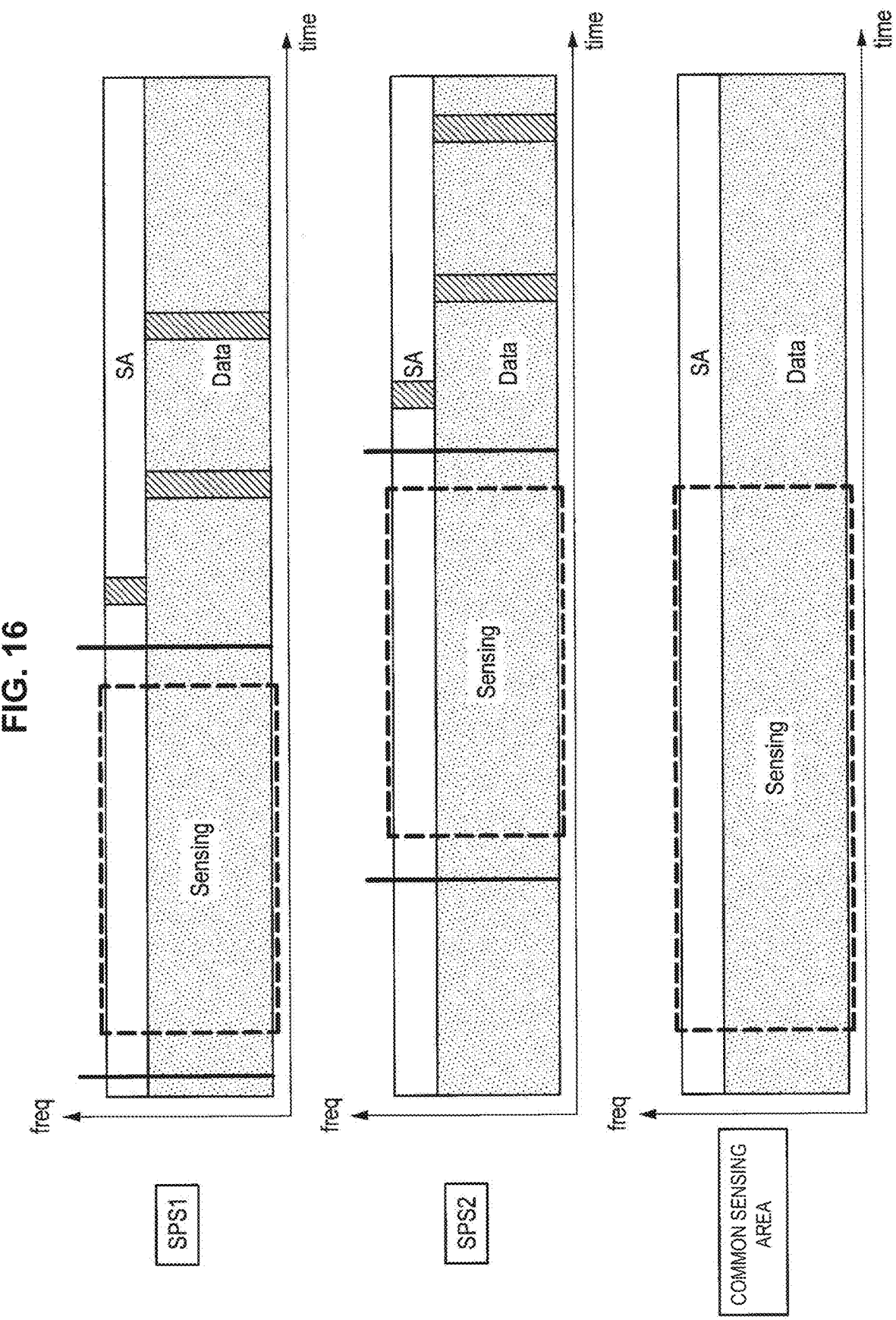
FIG. 16 is an explanatory diagram for describing a common sensing area.

FIG. 16 is an explanatory diagram for describing a common sensing area.

FIG. 16 illustrates two pieces of SPS (the SPS1 and SPS2). While parameters a_sps1 and b_sps1 are used as parameters for defining a sensing area in the SPS1, parameters a_com and b_com for defining a common sensing area are allocated to the SPS2.

Note that, with respect to each piece of SPS, whether the common sensing area is to be used or a sensing area defined independently of each piece of SPS may be notified to the terminal device through SIB or RRC signaling from the base station. This information may be set for each terminal device, each cell, of each traffic type. In addition, this information may be set in the terminal device in advance.

In addition, a case in which transmission packets are generated in a sensing area and thus the terminal device can no longer perform sensing is also conceivable. In this case, the terminal device may extend the sensing area by the time for which sensing is not executed. That is, if the parameters a and b are used, the terminal device may extend the sensing area by b−a+z (z is the extended amount). In addition, in a case in which the extended sensing area is greater than or equal to a threshold value, a case in which b−a+z exceeds a threshold value TH1, or a case in which z exceeds a threshold value TH2, for example, the terminal device may redo sensing. The threshold values may be notified to the terminal device through SIB or RRC signaling from the base station. The threshold values may be set for each terminal device, each cell, or each traffic type. In addition, the threshold values may be set in the terminal device in advance.

In V2X communication, messages with a variety of levels of priority are transmitted. Thus, how priority level information is to be reflected in resource selection, or how priority level information is acquired is important for the terminal device.

The terminal device may put priority level information of packets in, for example, SA. Another terminal device can specify the priority level information of the packets and resources to be used for the packets in SA decoding. In addition, as a technique for identifying priority level information, the terminal device may identify the information using, for example, the number of repetitions of SA, a resource allocation position at the time of repetition thereof, or allocation of SA itself. Of course, the terminal device may also identify the priority level information using a resource allocation position of data, instead of SA.

In addition, the terminal device may put priority level information of packets in SA and use the priority level information of the packets in, for example, resource selection. Another terminal device can specify the priority level information of each packet and a resource to be used by the packet in SA decoding. Likewise, another terminal device can perform energy detection and specify a resource with a relatively low level of power. Even in a case in which it is ascertained in SA decoding that resources are being occupied, the terminal device can select a resource with a relatively low level of power on which a packet with a low level of priority is being transmitted when the terminal device has a packet with a high level of priority by using the received priority level information of the packets, the result of energy detection, and the priority level information of the packet to be transmitted by a transmission terminal.

In addition, the terminal device may put, for example, information of a transmission source in SA. The information of a transmission source may be an attribute (a vehicle, a pedestrian, etc.) of the transmission source, uniquely identifiable information such as an ID, or the like. Another terminal device can specify the information of the transmission source of each packet and the resource to be used for the packet in SA decoding.

In a case of the pedestrian UE, since there is a request for performing transmission with suppressed power consumption as much as possible, it is anticipated that the number of packet transmission operations is smaller than in a case of a vehicle. Thus, when the terminal device performs sensing and resource selection, it is necessary to preferentially project the pedestrian UE. Thus, if the terminal device executes sensing and can determine characteristics of the transmitter, resource selection can be performed without affecting the resource being used by the transmitter.

Meanwhile, it can be determined that a little interference may not cause a problem to a terminal deemed to be robust, for example, a terminal such as a vehicle. Thus, even when the terminal device performs sensing and ascertains that a terminal such as a vehicle is using a resource, the terminal device may adjust transmission power or the like to reduce interference and perform transmission.

In addition, the terminal device may put, for example, transmission power information in SA. The transmission power information can include a transmission power value, TPC command information notified by the base station. Another terminal device may calculate an amount of path loss from the acquired transmission power information and reception power information and determine whether the same resource can be used. If the amount of reception power information is extremely smaller than the amount of transmission power information, for example, the terminal device that transmitted the radio wave is assumed to be in a remote place, and thus the terminal device can determine that the same resource can be used. The terminal device may use energy sensing to calculate the path loss. In addition, the terminal device may determine whether the same resource is to be used from the absolute value of reception power. In addition, the terminal device may determine whether the same resource can be used along with the priority level information of packets and adjust maximum transmission power.

The terminal device can calculate the amount of path loss using information of transmission power and reception power at the time at which sensing is executed. The path loss can help predict how far is the area to which the terminal serving as a transmission source belongs. At this time, in a case in which the terminal device executing sensing has a packet that is likely to be transmitted with a relatively low level of power consumption (e.g., a case in which a message is periodically transmitted and congestion is occurring and thus the transmission power may be low, etc.), the terminal device can determine whether transmission can be performed on the same resource, considering the distance to the terminal device serving as the transmission source.

In addition, the terminal device may determine transmission on the same resource for each level of priority of packets. For example, the terminal device may calculate the amount of path loss even in a case in which resources has been occupied as a result of SA decoding and determine whether transmission is really possible. In a case in which the level of priority of a transmission packet is high, the terminal device can execute such sensing and thus can select a resource that can be further used even if it is an occupied resource, and can execute transmission of a packet with a high level of priority that should be transmitted by all means.

(3. Resource Selection)

Terminal devices execute resource selection on the basis of a sensing result of a resource area. In a case in which there is no available resource, it is not possible for the terminal devices to perform transmission until an available resource is found. In such a case, there is a possibility that there may be a terminal device having difficulty in transmitting a message for a long period of time. Thus, it is desirable to prepare a resource selection method that is likely to keep fairness between the terminal devices. That is, a way of enabling a terminal device that has difficulty in selecting a resource in a resource selection phase to perform sensing and preferentially select a resource is important.

Therefore, in the present embodiment, a terminal device that has performed sensing and had difficulty in selecting a resource in the resource selection phase forcedly transitions to a reselection phase. For example, in a case in which a counter value is set to 0 as a trigger for reselection of a resource and it is not possible to select a resource in the resource selection phase, a terminal device transitions to the reselection phase by forcedly setting the counter value to 0. At this time, the terminal device increases the value of a counter (a forced reselection counter) that records the number of forced transitions to the reselection phase. Of course, another setting may be sued as the trigger for reselection of a resource.

In addition, the terminal device that has forcedly transitioned to the reselection phase may increase the value of the counter by a predetermined amount (x) next time. When the value is increased, the resource can be used for a long time next time. The value x may be notified to the terminal device through SIB or RRC signaling from the base station. The value x may be set for each terminal device, each cell, or each traffic type. In addition, the value x may be set in the terminal device in advance.

An increment or decrement of the counter next time may be adjusted by a forced reselection counter. For example, the result obtained by applying the forced reselection counter to x may be the increment or decrement of the counter next time, or the result obtained by multiplying the forced reselection counter by x may be the increment or decrement of the counter next time In addition, the terminal device that has forcedly transitioned to the reselection phase may shorten the sensing period of next time. For example, the value of the parameter a defining the sensing period may be subtracted by a predetermined amount (y). The value y may be notified to the terminal device through SIB or RRC signaling from the base station. The value y may be set for each terminal device, each cell, or each traffic type. In addition, the value y may be set in the terminal device in advance.

When a value of the forced reselection counter is greater than or equal to a predetermined threshold value, the terminal device may report the effect to the base station. The base station preferentially allocates a resource to the terminal device having the value of the forced reselection counter greater than or equal to the threshold value. The threshold value may be notified to the terminal device through SIB or RRC signaling from the base station. The threshold value may be set for each terminal device, each cell, or each traffic type. In addition, the threshold value may be set in the terminal device in advance.

The base station may provide, for example, a new resource pool to the terminal device having the value of the forced reselection counter greater than or equal to the threshold value or instruct another terminal device to hold transmission.

The terminal device may determine a resource that has not been occupied by another terminal to be a resource on which transmission possible using information obtained from SA, or determine the resource to be a resource on which transmission is possible using energy sensing if the value is equal to or smaller than the prescribed threshold value. If there is no resource not occupied by another terminal using the information obtained from SA, the terminal device may determine a resource as a resource on which transmission is possible using energy sensing if the value is equal to or smaller than the prescribed threshold value.

At this time, the terminal device may select a resource using a threshold value set for each piece of priority level information. As the priority level information, for example, there can be a transmission packet type, the type of terminal device (a pedestrian, a vehicle, etc.), a transmission packet size, a forced reselection counter (backoff type), or the like. The threshold value for each piece of priority level information may be notified to the terminal device through SIB or RRC signaling from the base station. The threshold value may be set for each terminal device, each cell, or each traffic type. In addition, the threshold value may be set in the terminal device in advance.

In addition, at this time, the terminal device may select a resource in accordance with a level of transmission power. For example, a terminal device having a low level of transmission power may be able to use a resource from which a certain level of power has been detected, and a terminal device having a high level of transmission power may select a resource from which a low level of power. The association of transmission power and the threshold value information may be notified to the terminal device through SIB or RRC signaling from the base station. The association may be set for each terminal device, each cell, or each traffic type. In addition, the association may be set in the terminal device in advance. In addition, the terminal device may use TPC command information notified of from the base station, instead of transmission power.

In addition, the terminal device may determine whether a resource is to be used in accordance with transmission power of the device itself. For example, the terminal device may determine to use a resource if the difference between the level of detected power and the level of transmission power of the device itself exceeds a threshold value. The threshold value may be notified to the terminal device through SIB or RRC signaling from the base station. The threshold value may be set for each terminal device, each cell, or each traffic type. In addition, the threshold value may be set in the terminal device in advance.

(Improvement of Power Consumption in V2P Communication)

Next, improvement of power consumption in V2P communication will be described. Requirements of V2P communication are, for example, as follows.

Delay requirement: A delay between a server and a terminal to be within 500 ms. 100 ms in end-to-end of V2P.

Operation requirement: Support Multi Mobile Network Operator (MNO)

Power consumption requirement: Minimize battery consumption

Coverage requirement: Cover a communication endurable range of about 4 seconds. About 110.8 m=27.7×4 at a speed of 100 kmh.

Message requirement: Typical size to be 50 to 300 bytes and 1200 bytes at maximum.

Communication quality requirement: Establish communication in an environment of a motorcycle to a vehicle at 280 km/h at the maximum and a pedestrian to a vehicle at 160 km/h at the maximum.

Since communication using a device such as a smartphone is assumed in a scenario of a pedestrian UE (a pedestrian terminal), an increase in power consumption caused by V2P communication is a significant problem, unlike for a vehicle having an ample battery capacity. Communication performed with low power consumption is necessary for implementing V2P communication. The problem relating to power consumption in V2P communication and a solution thereto will be described below.

(1) Operation of Pedestrian UE

In a case in which a pedestrian terminal and a vehicle terminal share the same resource pool and further the pedestrian terminal autonomously selects a resource, there is a possibility of a collision of the resource (resource collision) occurring and a packet reception ratio (PPR) of the vehicle terminal deteriorating. Like sensing by the vehicle terminal, if sensing is performed, the problem of the collision of resources can be improved. On the other hand, however, when the pedestrian terminal performs sensing of a resource, power consumption thereof increases. Thus, a method of activating the sensing function only when sensing is necessary is desirable. For example, there is a method of activating the sensing function in accordance with a position of a UE terminal or a congestion situation of a network, or the like.

A resource collision between the pedestrian terminal and the vehicle terminal can be avoided if the pedestrian terminal and the vehicle terminal use different resource pools. In this case, the pedestrian terminal can select a resource (random selection) at random without performing sensing.

An overall flow of the operation is measurement→determination→control. The implementing subject of each process is a network side or a terminal side. The control includes autonomous control and central control. In the case of autonomous control, activation of the sensing function based on position information and activation of the sensing function through signal detection (signaling) are considered. In addition, in the case of central control, activation of the sensing function through an instruction from a network, an eNB, an RSU, or a third party terminal is considered.

The difference between autonomous control and central control only depends on whether the determining subject is the UE side or the network side. Thus, in each of the activation based on position information and activation through signal detection, two determinations by the UE side and the network side will be described. Note that the network side indicates a centralized control station such as an eNB or an RSU in the present embodiment.

(1-1) Activation Based on Position Information

In a case in which there is no vehicle terminal near a pedestrian, P2V communication is not necessary. Since automobiles run on roads, it is determined whether a pedestrian terminal is near the roads. Only in a case in which a pedestrian terminal is near a road, the sensing function is activated. Measurement of a position, determination of whether a terminal is near a road, and control of the sensing function may be performed either of the pedestrian UE side or the network side. In a case in which activation is not performed depending on the result of the determination, the pedestrian UE can select a candidate resource in a resource pool at random. In addition, signaling may be required when necessary in a case in which execution places are different.

Positioning methods performed on the terminal side include GNSS, A-GNSS, and the like. Positioning methods performed on the network side include Observed Time Difference of Arrival (OTDOA), Uplink Time Difference of Arrival (UTDOA), D2D-aided positioning, Enhanced Cell Identification (E-CID), Terrestrial Beacon System (TBS), measurement based on Wi-Fi(registered trademark) or Bluetooth (registered trademark), and the like.

An example of the determination process will be introduced. Map information is acquired in advance and position information of the pedestrian UE is compared with the map information. Then, in a case in which the pedestrian UE is determined to be near a road, sensing is activated. In addition, whether to activate sensing may be determined on the basis of three-dimensional information. That is, a height direction may be considered during determination. For example, a pedestrian UE on a pedestrian bridge may not perform sensing. In addition, in a case in which a pedestrian UE is determined to approach a road within a certain period of time, it may be determined to activate sensing.

An example of the control process will be introduced. In the control process, the sensing function of the pedestrian UE is activated. A parameter necessary for sensing may be provided from the network side to the pedestrian UE side, and the network may configure (preconfigure) a parameter necessary for sensing for the pedestrian UE. Note that, in a case in which the sensing function of the pedestrian UE is not activated, notification is performed explicitly or implicitly.

Information of a time axis includes, for example, a sensing cycle, sensing duration, and a starting point of sensing. Information of a frequency axis includes, for example, a band in which sensing is performed. Sensing methods include, for example, SA decoding, energy sensing, and a combination of SA decoding and energy sensing.

Figure 23:
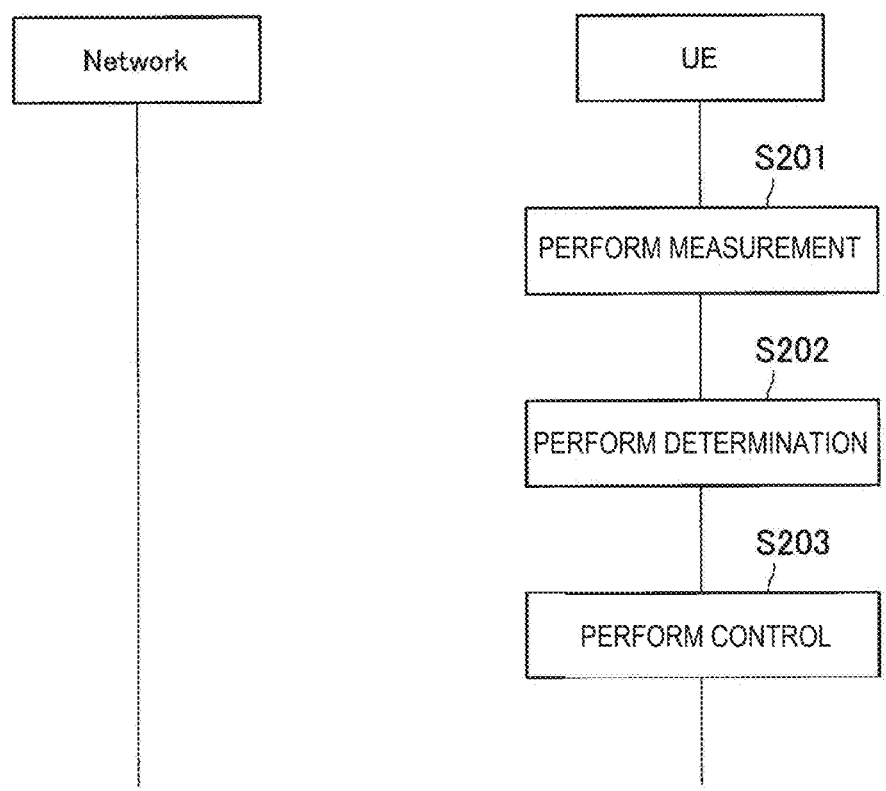
FIG. 23 is an explanatory diagram illustrating an example of a process performed on a Network side and a pedestrian UE side according to the embodiment.

A flow of the series of processes will be described with reference to a drawing. FIG. 23 is an explanatory diagram illustrating an example of a process performed on the network side and the pedestrian UE side according to an embodiment of the present disclosure. In FIG. 23, the example in which all of measurement, determination, and control are performed on the pedestrian UE side is illustrated. That is, the pedestrian UE performs a position measurement process (Step S201), performs a determination process of determining whether the sensing function is to be activated on the basis of the measurement result (Step S202), and executes control based on the determination process (Step S203). In this case, signaling is unnecessary. In addition, the pedestrian UE follows the flow in the case of out-of-coverage (OOC). In addition, in this case, information regarding sensing is configured (preconfigured) to the pedestrian UE.

Figure 24:
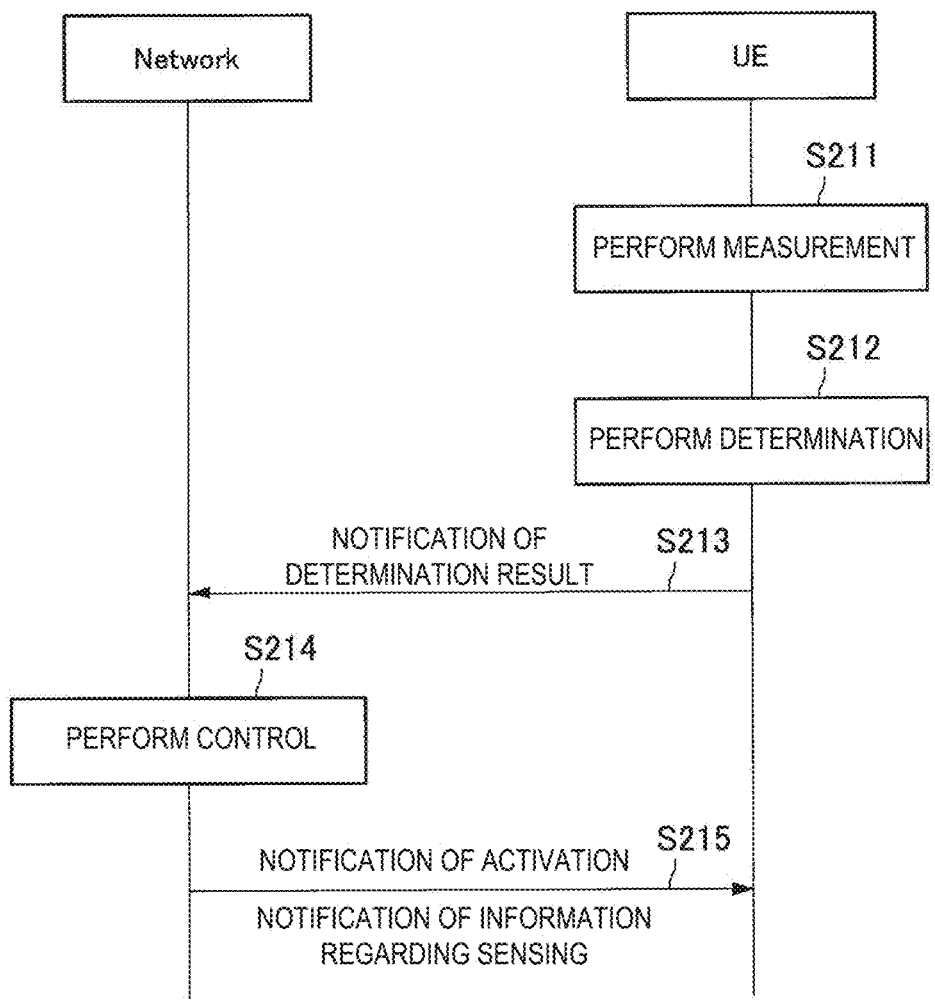
FIG. 24 is an explanatory diagram illustrating an example of a process performed on a Network side and a pedestrian UE side according to the embodiment.

FIG. 24 is an explanatory diagram illustrating an example of a process performed on the network side and the pedestrian UE side according to an embodiment of the present disclosure. In FIG. 24, an example in which measurement and determination are performed on the pedestrian UE side and control is performed on the network side is illustrated. That is, the pedestrian UE performs a position measurement process (Step S211), performs a determination process of determining whether the sensing function is to be activated on the basis of the measurement result (Step S212), and notifies the network side of the determination result (Step S213). The network side executes control based on the determination result (Step S214), and gives a notification of activation of the sensing function and a notification of information regarding sensing (Step S215). In a case in which the information regarding sensing is configured (preconfigured) to the pedestrian UE, the pedestrian UE does not have to notify the network side of the determination result. In addition, in this case, signalling is unnecessary in a case in which activation is not performed, and the pedestrian UE performs random selection.

Figure 25:
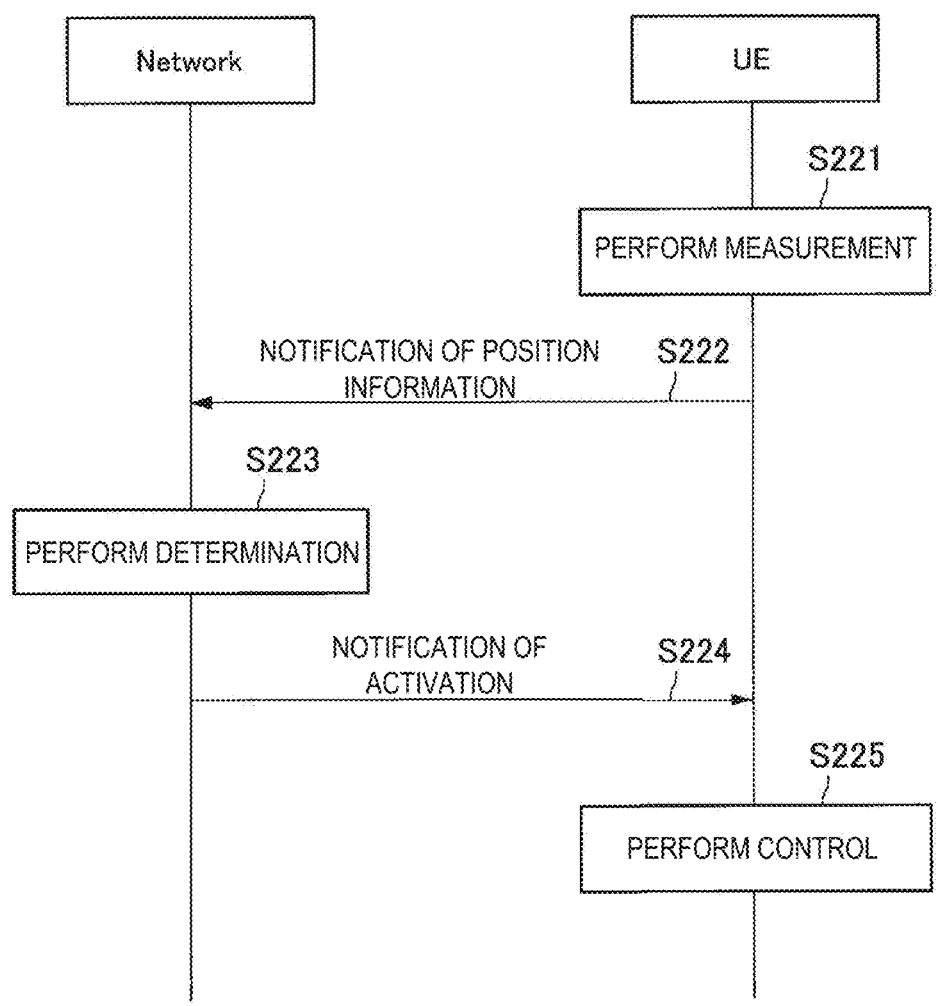
FIG. 25 is an explanatory diagram illustrating an example of a process performed on a Network side and a pedestrian UE side according to the embodiment.

FIG. 25 is an explanatory diagram illustrating an example of a process performed on the network side and the pedestrian UE side according to an embodiment of the present disclosure. In FIG. 25, an example in which measurement and control are performed on the pedestrian UE side and determination is performed on the network side is illustrated. That is, the pedestrian UE performs a position measurement process (Step S221) and notifies the network side of the measurement result (Step S222). The network side performs a determination process of determining whether the sensing function is to be activated on the basis of the measurement result (Step S223) and notifies the pedestrian UE of activation of the sensing function (Step S224). The pedestrian UE executes control based on the notification (Step S225). In this case, information regarding sensing is configured (preconfigured) to the pedestrian UE.

Figure 26:
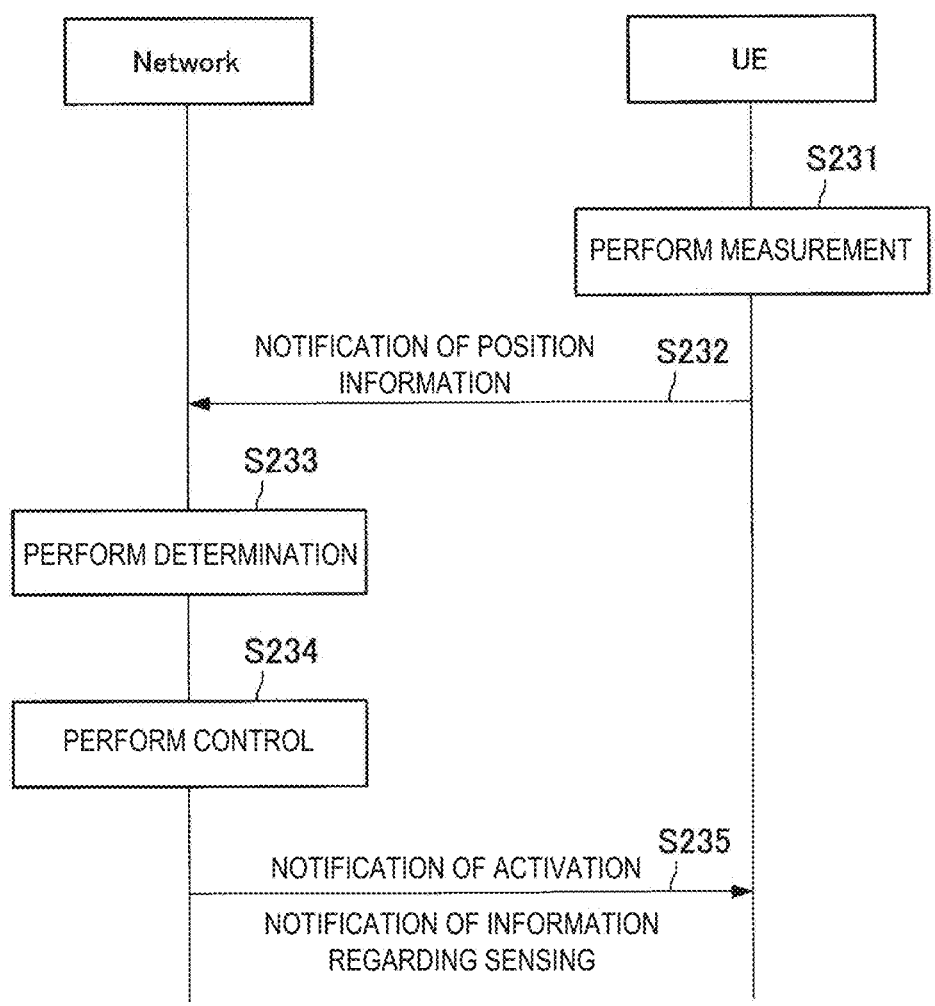
FIG. 26 is an explanatory diagram illustrating an example of a process performed on a Network side and a pedestrian UE side according to the embodiment.

FIG. 26 is an explanatory diagram illustrating an example of a process performed on the network side and the pedestrian UE side according to an embodiment of the present disclosure. In FIG. 26, an example in which measurement is performed on the pedestrian UE side, and determination and control are performed on the network side is illustrated. That is, the pedestrian UE performs a position measurement process (Step S231) and notifies the network side of the measurement result (Step S232). The network side performs a determination process of determining whether the sensing function is to be activated on the basis of the measurement result (Step S233) and executes control based on the determination process (Step S234). Then, the network side gives a notification of activation of the sensing function and a notification of information regarding sensing (Step S235). In this case, the information regarding sensing is configured (preconfigured) to the pedestrian UE.

Figure 27:
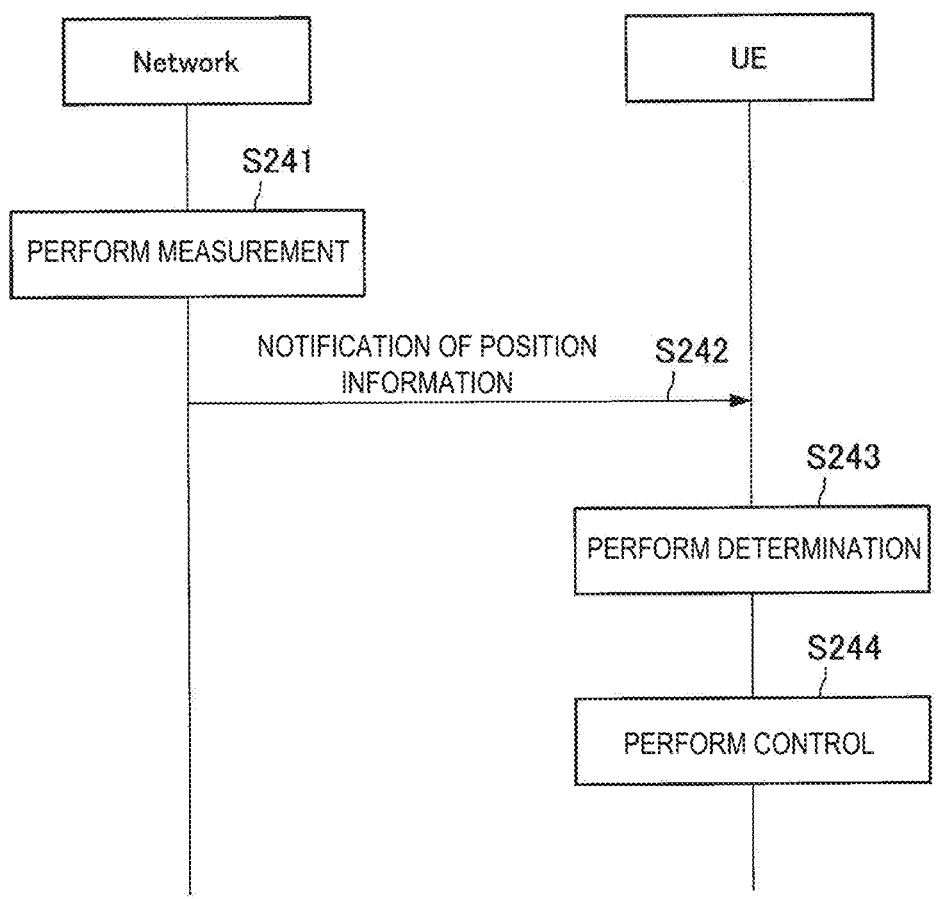
FIG. 27 is an explanatory diagram illustrating an example of a process performed on a Network side and a pedestrian UE side according to the embodiment.

FIG. 27 is an explanatory diagram illustrating an example of a process performed on the network side and the pedestrian UE side according to an embodiment of the present disclosure. In FIG. 27, an example in which measurement is performed on the network side, and determination and control are performed on the pedestrian UE side is illustrated. That is, the network side performs a position measurement process (Step S241) and notifies the pedestrian UE of the measurement result (Step S242). The pedestrian UE performs a determination process of determining whether the sensing function is to be activated on the basis of the acquired measurement result (Step S243) and executes control based on the determination process (Step S244). In this case, the information regarding sensing is configured (preconfigured) to the pedestrian UE.

Figure 28:
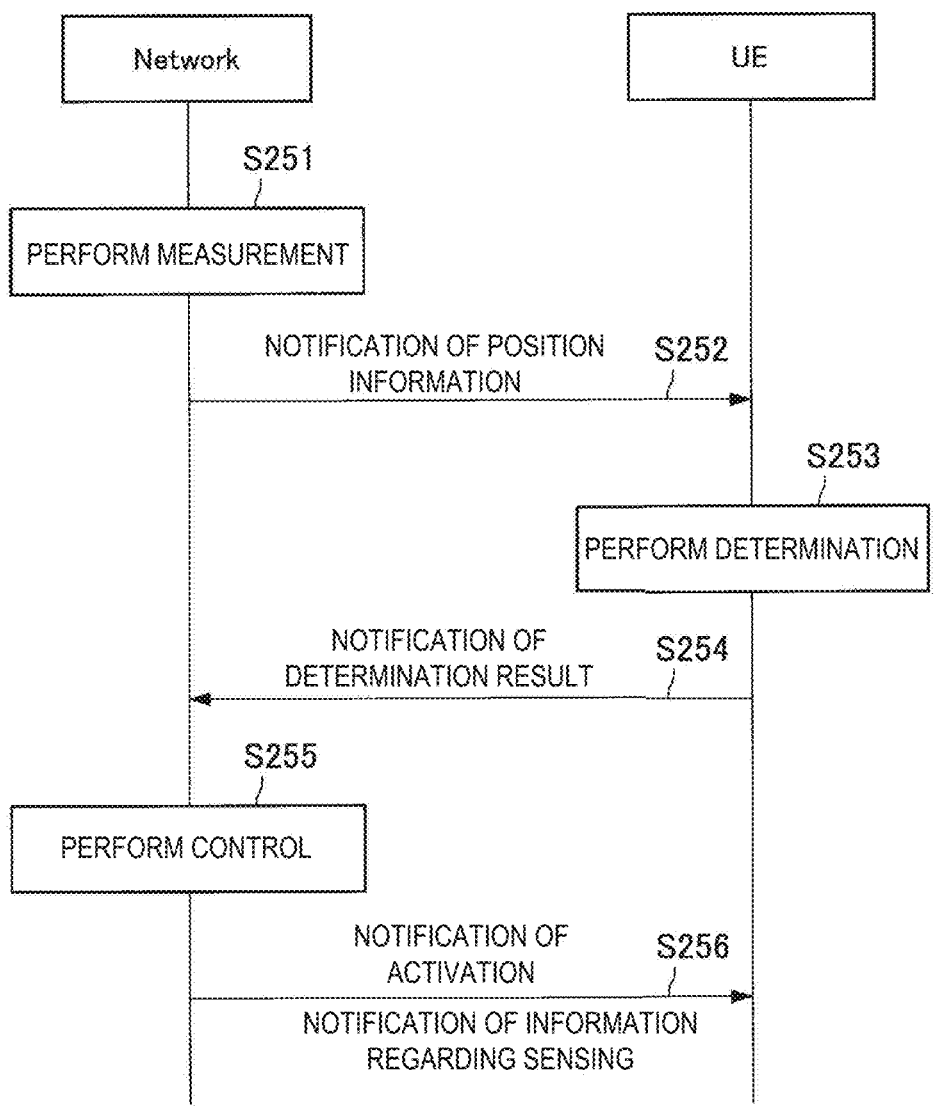
FIG. 28 is an explanatory diagram illustrating an example of a process performed on a Network side and a pedestrian UE side according to the embodiment.

FIG. 28 is an explanatory diagram illustrating an example of a process performed on the network side and the pedestrian UE side according to an embodiment of the present disclosure. In FIG. 28, an example in which measurement and control are performed on the network side, and determination is performed on the pedestrian UE side is illustrated. That is, the network side performs a position measurement process (Step S251), and notifies the pedestrian UE of the measurement result (Step S252). The pedestrian UE performs a determination process of determining whether the sensing function is to be activated on the basis of the acquired measurement result (Step S253) and notifies the network side of the determination result (Step S254). The network side executes control based on the determination result (Step S255) and gives a notification of activation of the sensing function and a notification of information regarding sensing (Step S256). In the case in which the information regarding sensing is configured (preconfigured) to the pedestrian UE, the pedestrian UE does not have to notify the network side of the determination result. In addition, in this case, signaling is unnecessary in the case in which activation is not performed, and the pedestrian UE performs random selection.

Figure 29:
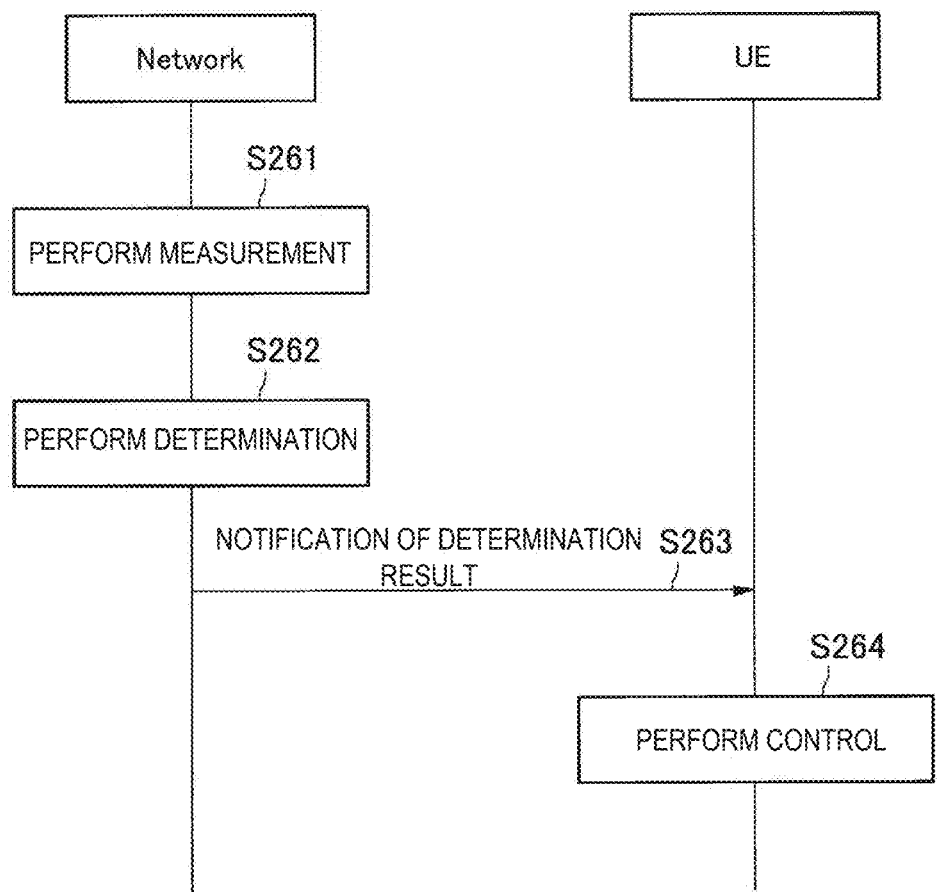
FIG. 29 is an explanatory diagram illustrating an example of a process performed on a Network side and a pedestrian UE side according to the embodiment.

FIG. 29 is an explanatory diagram illustrating an example of a process performed on the network side and the pedestrian UE side according to an embodiment of the present disclosure. In FIG. 29, an example in which measurement and determination are performed on the network side and control is performed on the pedestrian UE side is illustrated. That is, the network side performs a position measurement process (Step S261), performs a determination process of determining whether the sensing function is to be activated on the basis of the measurement result (Step S262), and notifies the pedestrian UE of the determination result (Step S263). The pedestrian UE executes control based on the determination process (Step S264). In this case, the information regarding sensing is configured (preconfigured) to the pedestrian UE.

Figure 30:
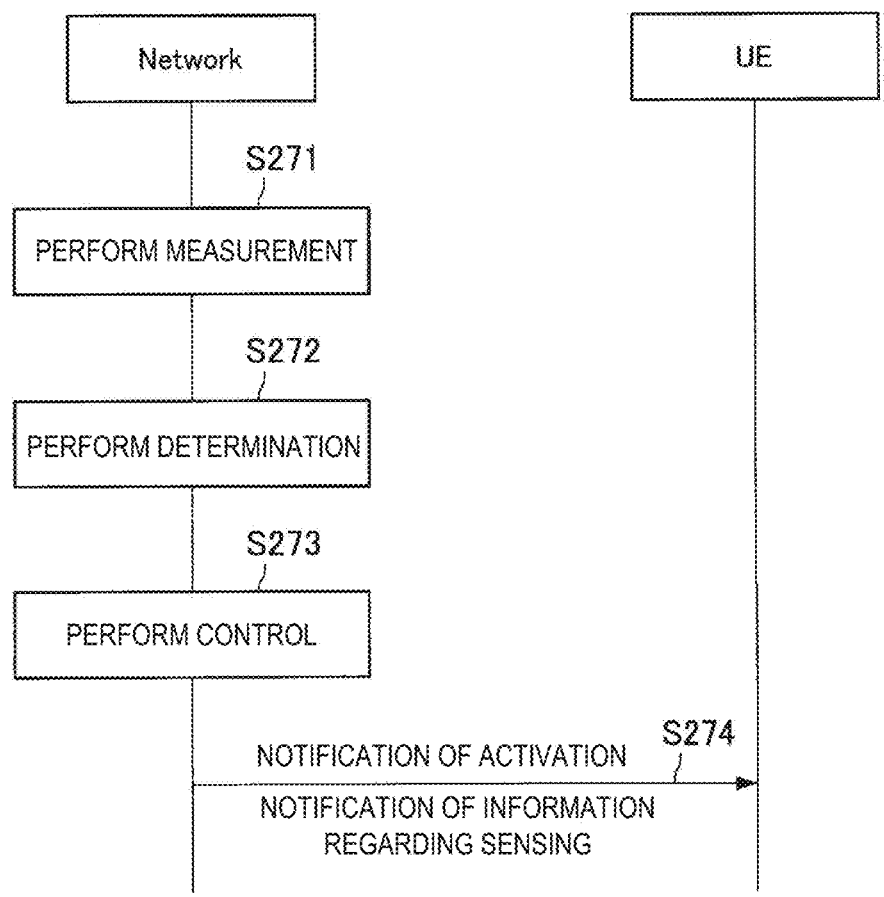
FIG. 30 is an explanatory diagram illustrating an example of a process performed on a Network side and a pedestrian UE side according to the embodiment.

FIG. 30 is an explanatory diagram illustrating an example of a process performed on the network side and the pedestrian UE side according to an embodiment of the present disclosure. In FIG. 30, an example in which all of measurement, determination, and control are performed on the network side is illustrated. That is, the network side performs a position measurement process (Step S271), performs a determination process of determining whether the sensing function is to be activated on the basis of the measurement result (Step S272), and executes control based on the determination process (Step S273). Then, the network side gives a notification of activation of the sensing function and a notification of information regarding sensing (Step S274). In the case in which the information regarding sensing is configured (preconfigured) to the pedestrian UE, the pedestrian UE does not have to notify the network side of the determination result. In addition, in this case, signaling is unnecessary in the case in which activation is not performed, and the pedestrian UE performs random selection.

(1-2) Activation Through Signal Detection

Next, an example of activation through signal detection will be described. In this example, the pedestrian UE activates the sensing function using detection of a signal from an automobile as a trigger. An eNB or an eNB-type RSU transmits a signal.

(Measurement)

A measurement target is, for example, power of a band in V2P communication, a sidelink synchronization signal/sidelink broadcast signal from an automobile, DCI from an eNB/RSU, a channel level of a network (which may be measured by the pedestrian UE or notified by an eNB or an RSU), or general information (a transmission time or a transmission band) of packets of a vehicle from an automobile or an eNB/RSU.

A measurement method is measurement using a parameter necessary for monitoring. The parameter necessary for monitoring is acquired from, for example, an eNB, an RSU, or a configured (pre-configured) parameter. The eNB, the RSU, or the configured parameter provides band information, synchronization information, and a measurement gap. The pedestrian UE acquires one or more of band information (information of a band to be monitored), synchronization information (synchronization information of the band being monitored; a frame timing, central frequency information, etc.), and measurement gap information (a measurement cycle, a measurement period, etc.) in accordance with a measurement target as follows.

The pedestrian UE performs measurement in accordance with the measurement gap. For example, an eNB, an RSU, or a configured (pre-configured) parameter is provided. A gap is set on the basis of information of the pedestrian UE. The information of the pedestrian UE includes, for example, position information of the terminal, an RF, a remaining battery capacity, and the like. In addition, the pedestrian UE may perform measurement in accordance with a level of congestion of the network.

(Determination)

The pedestrian UE activates the sensing function in a case in which a specific message, a signal or a message having a value higher than or equal to a certain threshold value is detected. The message includes, for example, a DO/broadcast signal, signal power, a channel level, or the like. The DO/broadcast signal includes information of a resource pool (e.g., sensing is unnecessary for the pedestrian if a resource pool dedicated to random selection is set). In addition, the DO/broadcast signal includes information regarding traffic of a vehicle UE. The information regarding traffic of the vehicle UE includes a transmission cycle that can be set by the vehicle UE. For example, sensing is unnecessary if a possibility of occurrence of a collision becomes low due to a traffic model of the pedestrian UE and the vehicle UE.

The signal power includes, for example, S-RSSI, RSRP, RSRQ, or the like of a band. The channel level includes, for example, a channel busy ratio (CBR), and in a case in which a CBR is higher than or equal to a certain threshold value, the pedestrian UE activates the sensing function.

(Control)

The pedestrian UE acquires or updates control information necessary for sensing. In a case in which a parameter is already provided or configured (pre-configured), the pedestrian UE uses the provided or configured (pre-configured) parameter. In addition, the pedestrian UE may inquire of an eNB or an RSU to acquire control information necessary for sensing or may receive broadcasting of control information necessary for sensing from an eNB or an RSU.

(2) Details of Sensing

In a case in which the sensing function of a pedestrian terminal becomes active, it is desirable to be sensed at all times (so-called full sensing) like a vehicle terminal, but power consumption of the pedestrian terminal becomes excessively large. Thus, even in the case in which the sensing function of a pedestrian terminal becomes active, more reduction in power consumption is demanded. If a pedestrian terminal uses a sensing method different from that of a vehicle terminal, there is a possibility of parameters relating to sensing being different between the pedestrian terminal and the vehicle terminal on the basis of characteristics of transmission traffic and the like of the pedestrian terminal and the vehicle terminal. In addition, since it is difficult to know when packets of a pedestrian terminal are transmitted, it is hard to know the timing of resource selection. Thus, a setting of a sensing timing for the pedestrian terminal determines power consumption.

Thus, in the present embodiment, a pedestrian terminal senses only some resources, rather than performing full sensing. That is, a pedestrian terminal performs partial sensing. Partial sensing is classified into two types of partial sensing that are burst sensing and distributed sensing. Methods of each sensing will be described below.

(2-1) Burst Sensing

Figure 31:
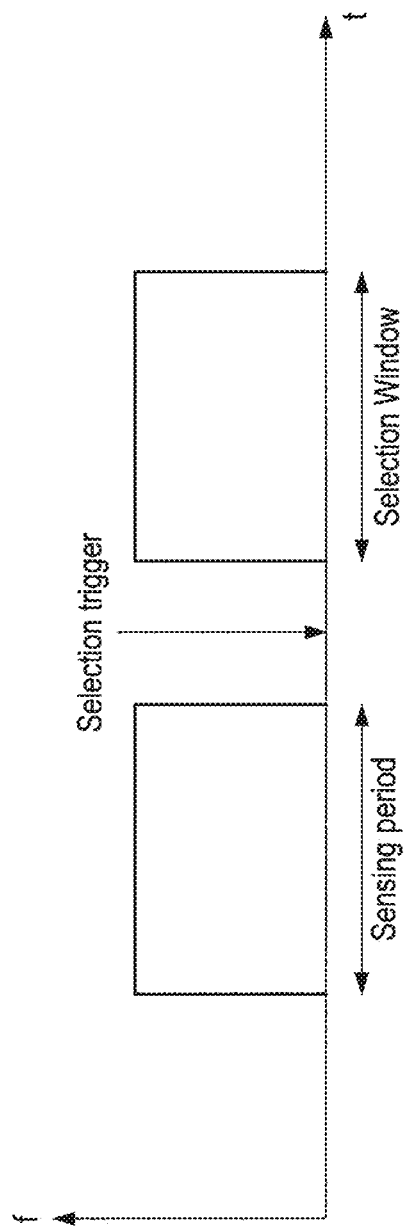
FIG. 31 is an explanatory diagram illustrating an example of burst sensing.

Burst sensing is a method of performing sensing only one time during a sensing period (which is a period in which a vehicle terminal performs sensing, and is set to, for example, 1s), resources to be sensed (a sub-sensing window) include consecutive subframes. A sub-sensing window has the same size as a resource candidate (a selection window) that can be transmitted. FIG. 31 is an explanatory diagram illustrating an example of burst sensing.

(2-2) Distributed Sensing

Figure 32:
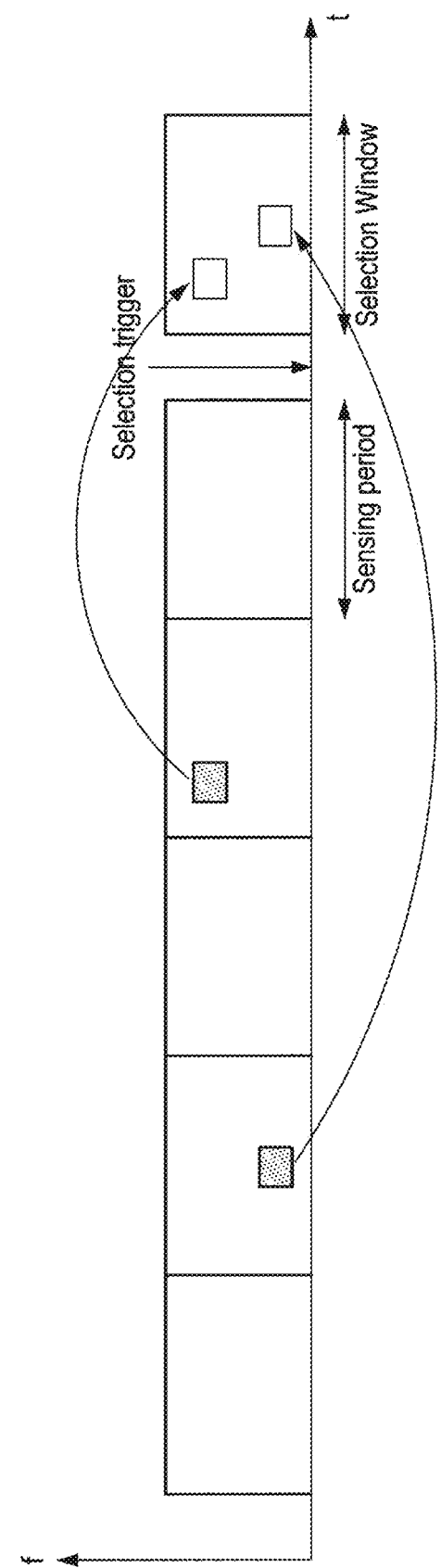
FIG. 32 is an explanatory diagram illustrating an example of burst sensing.

A maximum reservation cycle of a vehicle terminal is one second. In order to perform sensing while leaking as fewer transmission packets from a vehicle terminal as possible, full sensing is performed one second before resource selection is performed. In a case of burst sensing, only a resource within a certain period of time (shorter than one second) before resource selection is sensed. In a case in which a reservation cycle of the vehicle terminal is greater than the size of a burst sensing window, transmission packets may not be sensed. For that reason, there is a possibility of the pedestrian terminal selecting a resource that has already been used at the time of resource selection, which may lead to a collision. FIG. 32 is an explanatory diagram illustrating a problem that a collision has occurred due to use of burst sensing. Thus, it is necessary to perform sensing through the entire period of one second.

Figure 33:
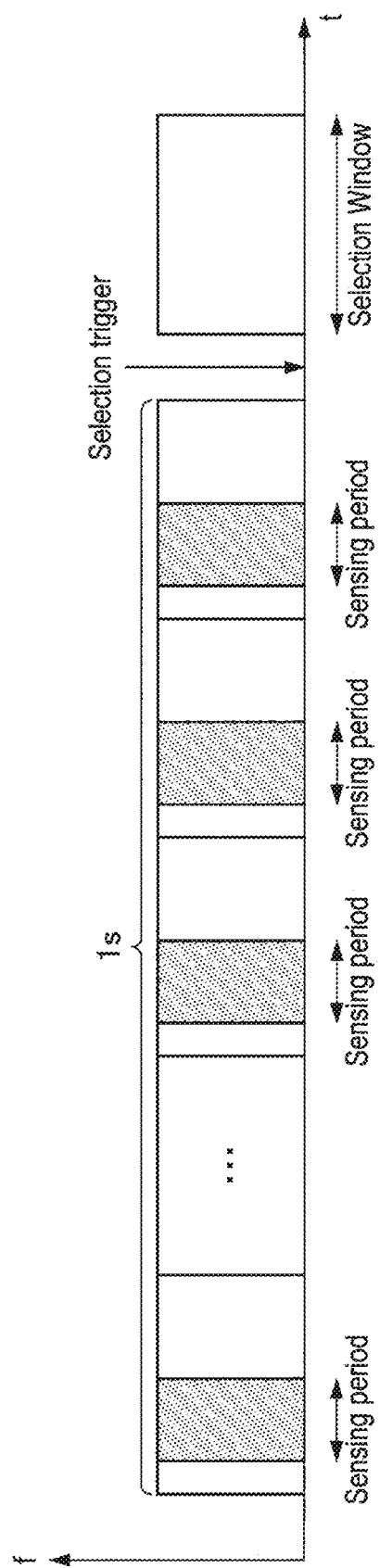
FIG. 33 is an explanatory diagram illustrating an example of distributed sensing.

Distributed sensing is executed by performing sensing a plurality of times within a period for sensing. Each of sensing periods is defined as a sensing period. Each of sub-sensing periods has the same size as a selection window. Using the sensing result of a plurality of sensing periods, a terminal recognizes a resource use situation in a selection window and decides a resource for transmission. For example, in a case in which a period for sensing is one second, for example, the period is divided into periods of 100 milliseconds, and a sensing period is decided within the periods. FIG. 33 is an explanatory diagram illustrating an example of distributed sensing.

(Distributed Sensing with Fixed Window)

Figure 34:
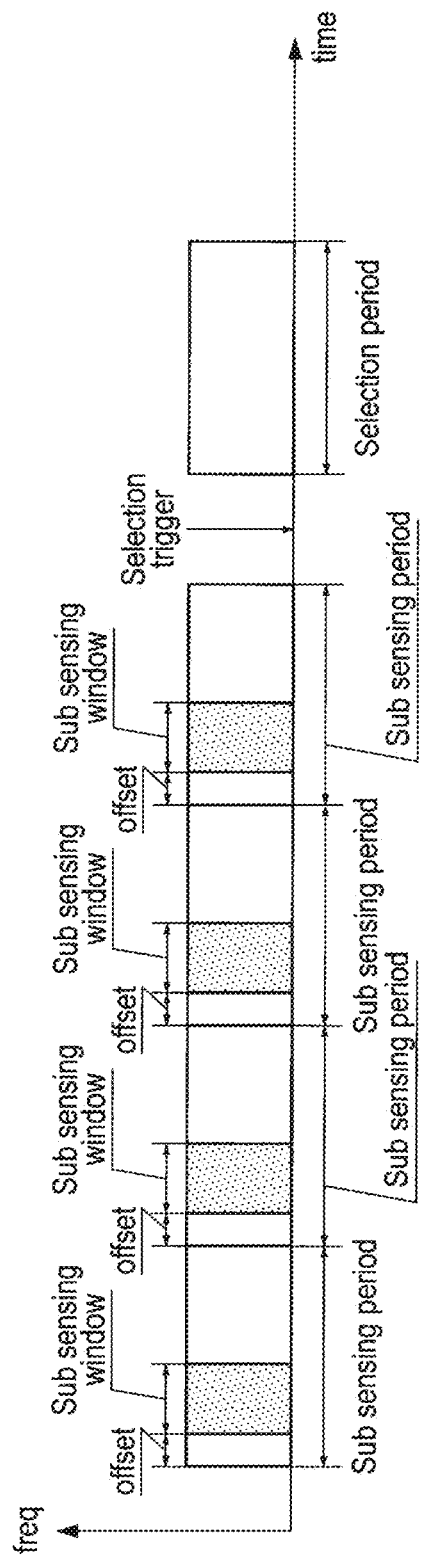
FIG. 34 is an explanatory diagram illustrating an example of sensing with an identical setting for each sub-sensing.

If subframes for one second (1000 subframes) are compartmentalized every 100 ms, the result is 10 periods. 10 times of sub-sensing are performed in all the periods. Respective sub-sensing periods can also be set to be the same through the period for sensing. That is, a sensing starting subframe, a sensing period, and a sensing interval of each of the sensing periods are fixed. FIG. 34 is an explanatory diagram illustrating an example of sensing with an identical setting for each sub-sensing. Furthermore, it is desirable for a pedestrian terminal to perform sensing the same area as a resource pool for transmission of the terminal, and since the same area as the resource pool for transmission is sensed, reliability is high.

(Distributed Sensing with Shifted Window)

Figure 35:
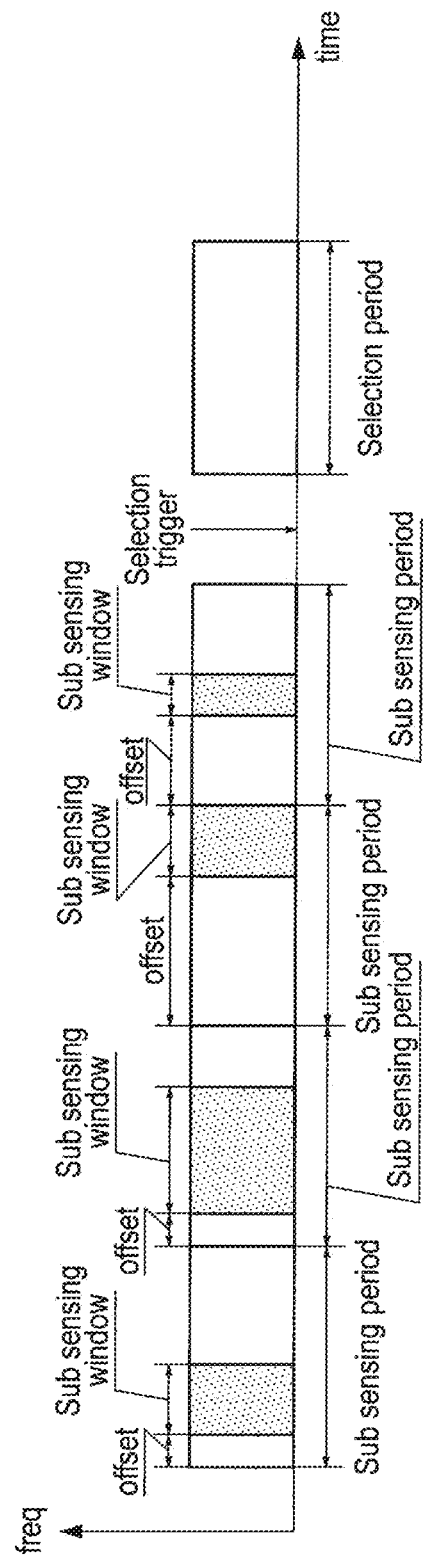
FIG. 35 is an explanatory diagram illustrating an example of sensing with varying settings for each sub-sensing.

If subframes for one second (1000 subframes) are compartmentalized every 100 ms, the result is 10 periods. 10 times of sub-sensing are performed in all the periods. Since a maximum delay of a transmission packet of a vehicle terminal is 100 ms, sub-sensing is performed every 100 ms. A setting for each sub-sensing, for example, a sensing starting subframe, a sensing period, and a sensing interval can be set variably. FIG. 35 is an explanatory diagram illustrating an example of sensing with varying settings for each sub-sensing. A pedestrian terminal may decide a starting subframe at random, and may also acquire a pattern from a base station side. Since a resource pool for transmission may not be restricted in a case of a shifted window, flexibility of resource selection can be increased. Such parameters relating to the sensing are set using one or more of a parameter relating to a packet reservation cycle (e.g., i*P: i is a constituent element of the packet reservation cycle (P*i), P is a fixed value serving as a base, and i is a parameter that can be set from a network), a parameter relating to packet reselection (a reselection counter), a channel busy ratio (CBR) that is a level of channel congestion, and a parameter used to determine a sensing target area.

Here, a method of changing a parameter of partial sensing using i will be described. Here, i is a constituent element of a packet reservation cycle (P*i), P is a fixed value serving as a base, and i is a parameter that can be set from a network. For example, P=100 ms for a vehicle terminal. Values that can be selected as i are indicated as a set. For example, the values are indicated like {0, 1, 2, 3 . . . }. In the case of i=0, packet reservation is not performed. If i is a value other than 0, the same resource for transmission of this time in the resource pool i-number ahead the resource pool for transmission of this time (the same frequency resource as the time resource with the same offset) is reserved. i may be set by a base station as a bitmap.

The parameters relating to sensing mentioned here can include a starting point of a sensing window, the size of the sensing window, a frequency domain of sensing, a resource pool of sensing, and a sensing window number.

A setting of the parameters relating to sensing may be made on the network side or by the pedestrian terminal itself. In addition, the parameters may be preconfigured to the terminal. Using a CBR of the network, the pedestrian terminal may set the parameters relating to sensing. In a case in which the network is congested, for example, the size of a sensing window is set to be large and the number of sensing candidates is increased. In addition, for example, a sub sensing period in which sensing is to be performed may be determined using a CBR. The pedestrian terminal may set the parameters relating to sensing using a parameter relating to packet reselection (a reselection counter, etc.). For example, an area in which sensing is performed may be set using a set value that can be set by the reselection counter.

Here, a method of setting the parameters relating to sensing using the parameter i relating to a reservation cycle, a CBR of a network, a parameter relating to packet reselection, and a parameter a will be described.

Here, α is a parameter indicating a sensing target area (a sub sensing window included in a sub sensing period). That is, a sub-sensing window to be sensed within a period for sensing is determined using the parameter a. The parameter a is notified by a base station. For example, determining sub sensing windows affecting a selection window with the parameter i, ranking them, and the order of sensing are determined using the parameter a. In addition, the base station may directly notify the terminal of sub sensing window numbers to be sensed.

When the pedestrian terminal performs sensing and then resource selection, available resources in resource candidates for transmission may be substantially small depending on the result of sensing. In that case, it is necessary to increase resources for transmission. Thus, resource candidates for resource selection are increased by extending the size of a sub sensing period. In addition, a new sensing area may be added into a sub sensing period, in addition to such extension.

A timing at which the size of a Sub sensing period is extended may be a case in which the terminal detects channel congestion a predetermined number of times or more. That is, after the pedestrian terminal performs sensing a predetermined number of times or more, a use ratio of resources among given transmission resource candidates is calculated. If the use ratio is higher than or equal to a certain level, the pedestrian terminal sets a new sensing candidate and performs sensing. In addition, in the case in which the terminal has detected channel congestion a predetermined number of times or more, the following sensing may be cancelled and switched to random selection.

Here, a predetermined number of sensing times (β) and a threshold value setting (θ) for determining sensing congestion may be set on the network side or set by the terminal itself. In addition, the values may be preconfigured.

In a case in which the pedestrian terminal performs sensing the number of sensing times greater than equal to β and a user ratio of resources among transmission resource candidates is higher than θ, the pedestrian terminal sets a new sensing candidate and performs sensing. If the pedestrian terminal completes sensing, a transmission resource is selected on the basis of all sensing results. The setting of the new sensing candidate may be made by the pedestrian terminal itself at random, or using a method set by the network side. When a new sensing candidate is set, for example, sensing shifts to a certain subframe on the basis of old sensing candidates.

In the case in which the pedestrian terminal performs sensing the number of sensing times greater than equal to β and a user ratio of resources among transmission resource candidates is higher than θ, sensing can be stopped to suppress power consumption. When the pedestrian terminal selects a transmission resource, an available resource among given transmission resource candidates based on the sensing result and all resources other than the transmission resource candidates are selected as candidates.

1.3. Configuration Example

Figure 17:
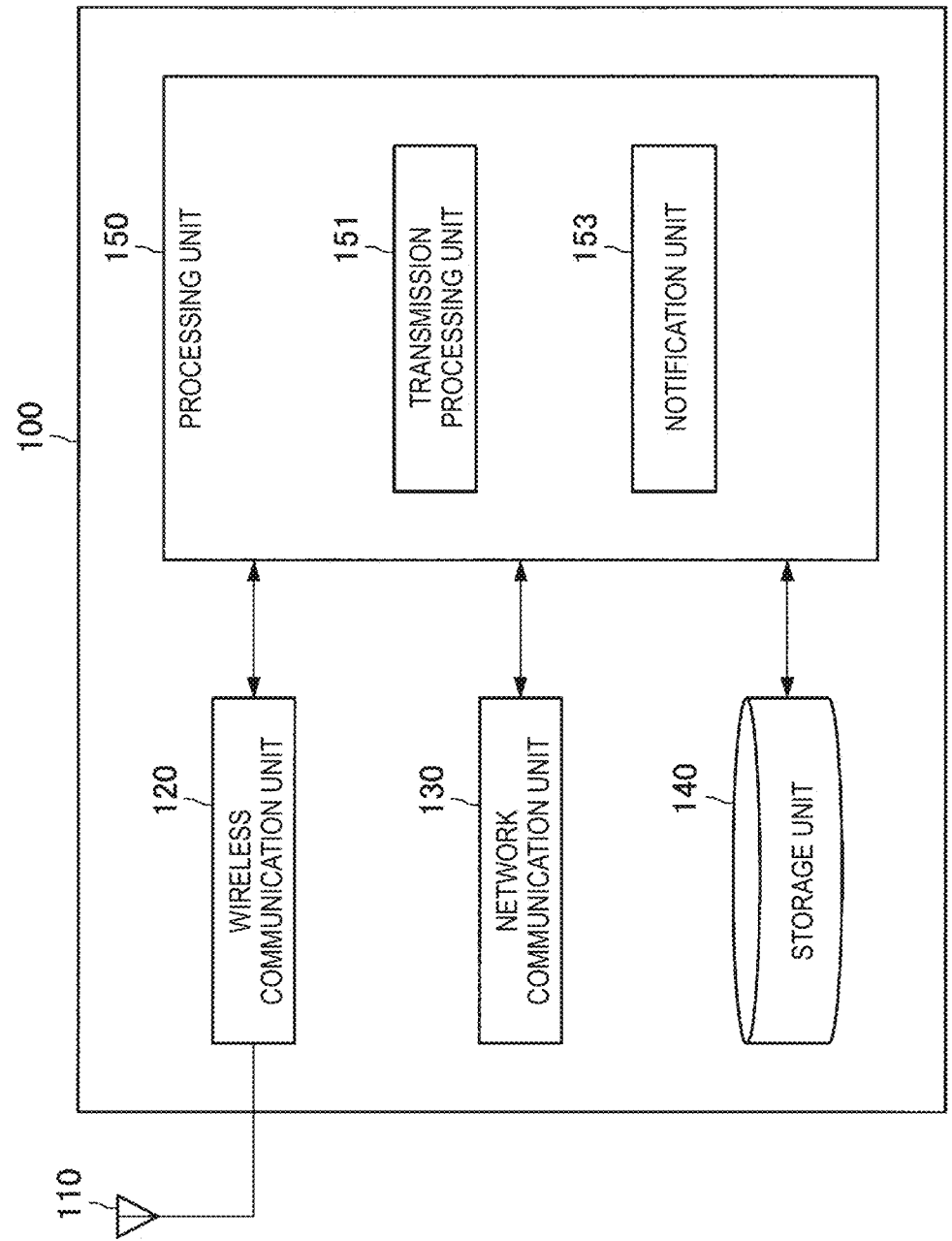
FIG. 17 is a block diagram illustrating an example of a configuration of a base station 100 according to an embodiment of the present disclosure.

Next, an example of a configuration of a base station (eNB) 100 according to an embodiment of the present disclosure will be described with reference to FIG. 17. FIG. 17 is a block diagram illustrating an example of the configuration of the base station 100 according to an embodiment of the present disclosure. Referring to FIG. 17, a base station 100 includes an antenna unit 110, a wireless communication unit 120, a network communication unit 130, a storage unit 140, and a processing unit 150.

(1) Antenna Unit 110

The antenna unit 110 radiates a signal output from the wireless communication unit 120 to the space as a radio wave. Further, the antenna unit 110 converts a radio wave in the space into a signal, and outputs the signal to the wireless communication unit 120.

(2) Wireless Communication Unit 120

The wireless communication unit 120 performs transmission and reception of signals. For example, the wireless communication unit 120 transmits a downlink signal to the terminal device and receives an uplink signal from the terminal device.

(3) Network Communication Unit 130

The network communication unit 130 performs transmission and reception of information. For example, the network communication unit 130 transmits information to other nodes and receives information from other nodes. For example, other node includes another base station and a core network node.

(4) Storage Unit 140

The storage unit 140 temporarily or permanently stores a program for the operation of the base station 100 and various data.

(5) Processing Unit 150

The processing unit 150 provides various functions of the base station 100. The processing unit 150 includes a transmission processing unit 151 and a notification unit 153. Further, the processing unit 150 may further include components other than these constituent elements. That is, the processing unit 150 may also perform an operation other than the operations of these components.

The transmission processing unit 151 executes a process related to transmission of data to be transmitted to a terminal device 200. In addition, the transmission processing unit 151 executes a general process of the base station (eNB). Further, the notification unit 153 executes a process related to notification of information to the terminal device 200. In other words, the notification unit 153 executes a general notification process for the terminal device of the base station (eNB).

The processing unit 150 can function as an example of a control unit in the present disclosure. With the configuration, the base station 100 can execute various processes relating to the present embodiment, for example, allocation of a resource to the terminal device 200, notification of information regarding the allocated resource to the terminal device 200, acquisition of information from the terminal device 200, and the like.

Figure 18:
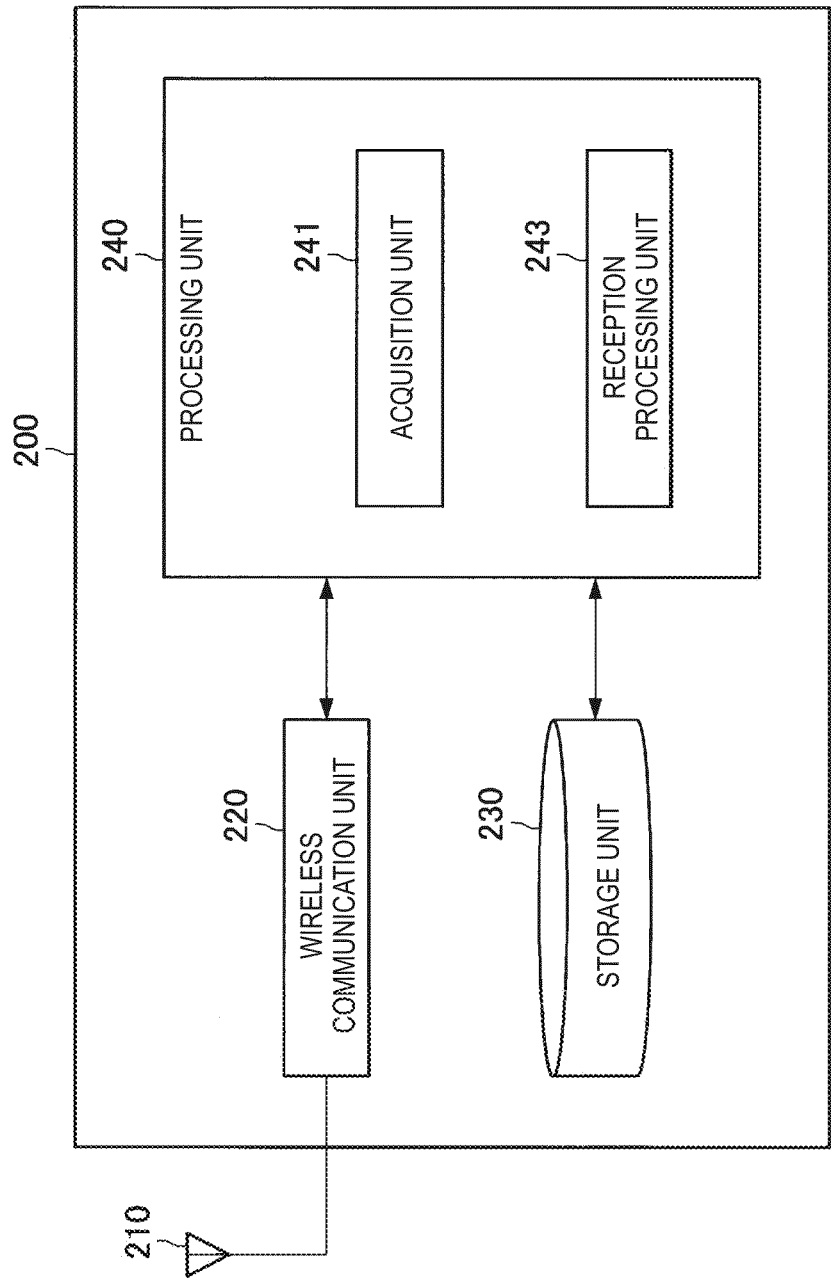
FIG. 18 is a block diagram illustrating an example of a configuration of a terminal device 200 according to an embodiment of the present disclosure.

Next, an example of a configuration of the terminal device 200 according to an embodiment of the present disclosure will be described with reference to FIG. 18. FIG. 18 is a block diagram illustrating an example of the configuration of the terminal device 200 according to an embodiment of the present disclosure. Referring to FIG. 18, the terminal device 200 includes an antenna unit 210, a wireless communication unit 220, a storage unit 230, and a processing unit 240.

(1) Antenna Unit 210

The antenna unit 210 radiates a signal output from the wireless communication unit 220 to the space as a radio wave. Further, the antenna unit 210 converts a radio wave in the space into a signal, and outputs the signal to the wireless communication unit 220.

(2) Wireless Communication Unit 220

The wireless communication unit 220 performs transmission and reception of signals. For example, the wireless communication unit 220 receives a downlink signal from the base station and transmits an uplink signal to the base station.

(3) Storage Unit 230

The storage unit 230 temporarily or permanently stores a program for the operation of the terminal device 200 and various data.

(4) Processing Unit 240

The processing unit 240 provides various functions of the terminal device 200. The processing unit 240 includes an acquisition unit 241 and a reception processing unit 243. Further, the processing unit 240 may further include other components than these constituent elements. That is, the processing unit 240 may also perform an operation other than the operations of these components.

The acquisition unit 241 executes a process related to acquisition of data transmitted from the base station 100. The reception processing unit 243 executes a process related to reception of data acquired by the acquisition unit 241. The reception processing unit 243 executes a general process of the terminal device described above.

The processing unit 240 can function as an example of a control unit in the present disclosure. With the configuration, the terminal device 200 can execute various processes relating to the present embodiment, for example, securing resources, reservation of resources, transmission of data to another terminal device and the base station 100, and the like.

2. APPLICATION EXAMPLES

The technology of the present disclosure can be applied to various products. The base station 100 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 100 may be realized as another type of base station such as a node B or a base transceiver station (BTS). The base station 100 may include a main body that controls radio communication (also referred to as a base station device) and one or more remote radio heads (RRHs) disposed in a different place from the main body. In addition, various types of terminals to be described below may operate as the base station 100 by temporarily or semi-permanently executing the base station function.

In addition, the terminal device 200 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 200 may be realized as a terminal that performs machine-to-machine (M2M) communication (also referred to as a machine type communication (MTC) terminal). Furthermore, the terminal device 200 may be a wireless communication module mounted in such a terminal (for example, an integrated circuit module configured in one die).

<2.1. Application Example with Regard to Base Station]

First Application Example

Figure 19:
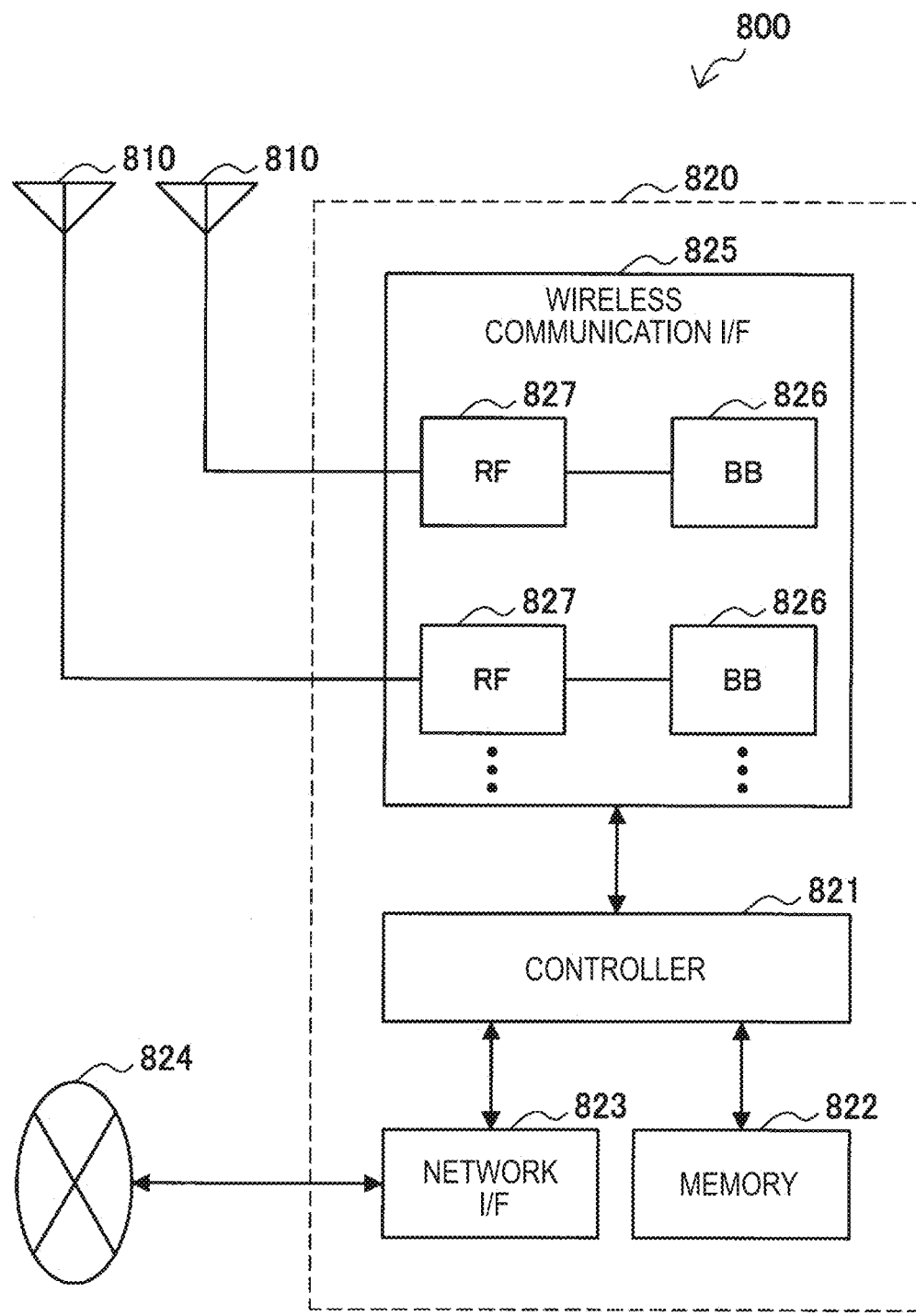
FIG. 19 is a block diagram illustrating a first example of a schematic configuration of an eNB to which the technology of the present disclosure can be applied.

FIG. 19 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 19. For example, the multiple antennas 810 may be compatible with multiple frequency bands used by the eNB 800. Although FIG. 19 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (e.g. S1 interface or X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 19. For example, the multiple BB processors 826 may be compatible with multiple frequency bands used by the eNB 800. The wireless communication interface 825 may include the multiple RF circuits 827, as illustrated in FIG. 19. For example, the multiple RF circuits 827 may be compatible with multiple antenna elements. Although FIG. 19 illustrates the example in which the wireless communication interface 825 includes the multiple BB processors 826 and the multiple RF circuits 827, the wireless communication interface 825 may also include a single BB processor 826 or a single RF circuit 827.

In the eNB 800 shown in FIG. 19, one or more constituent elements (the transmission processing unit 151 and/or the notification unit 153) included in the processing unit 150 described with reference to FIG. 17 may be implemented by the wireless communication interface 825. Alternatively, at least some of these constituent elements may be implemented by the controller 821. As an example, a module which includes a part (for example, the BB processor 826) or all of the wireless communication interface 825 and/or the controller 821 may be mounted in the eNB 800, and the above-described one or more constituent elements may be implemented by the module. In this case, the module may store a program for causing the processor to function as the above-described one or more constituent elements (i.e., a program for causing the processor to execute operations of the one or more constituent elements) and may execute the program. As another example, the program for causing the processor to function as the above-described one or more constituent elements may be installed in the eNB 800, and the wireless communication interface 825 (for example, the BB processor 826) and/or the controller 821 may execute the program. As described above, the eNB 800, the base station device 820 or the module may be provided as a device which includes the one or more constituent elements, and the program for causing the processor to function as the above-described one or more constituent elements may be provided. In addition, a readable recording medium in which the program is recorded may be provided.

In addition, in the eNB 800 shown in FIG. 19, the wireless communication unit 120 described with reference to FIG. 17 may be implemented by the wireless communication interface 825 (for example, the RF circuit 827). Further, the antenna unit 110 may be implemented by the antenna 810. Moreover, the network communication unit 130 may be implemented by the controller 821 and/or the network interface 823. Further, the storage unit 140 may be implemented by the memory 822.

Second Application Example

Figure 20:
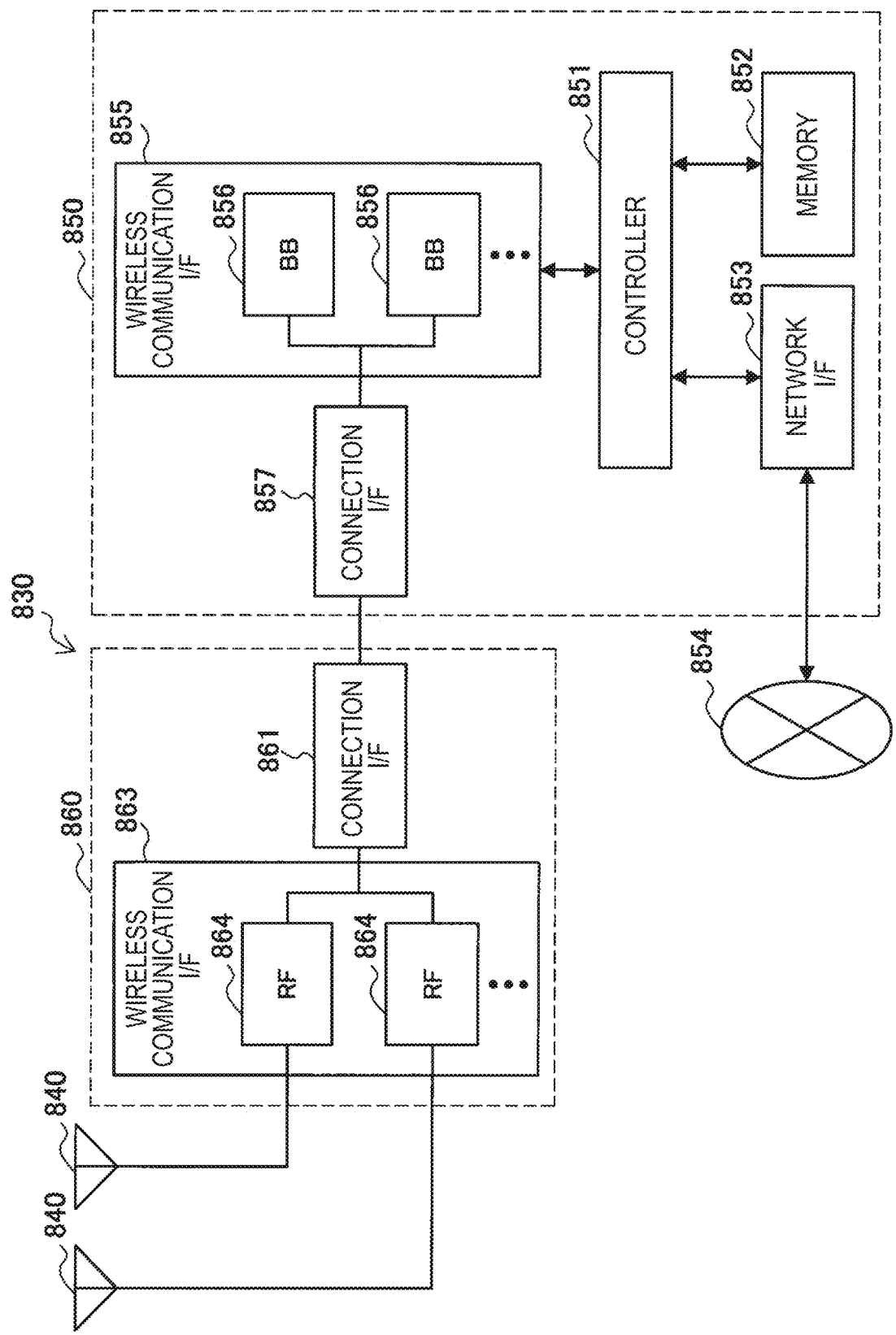
FIG. 20 is a block diagram illustrating a second example of the schematic configuration of the eNB to which the technology of the present disclosure can be applied.

FIG. 20 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 20. For example, the multiple antennas 840 may be compatible with multiple frequency bands used by the eNB 830. Although FIG. 20 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 19.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 19, except the BB processor 856 is connected to the RF circuit 864 of the RRH 860 via the connection interface 857. The wireless communication interface 855 may include the multiple BB processors 856, as illustrated in FIG. 20. For example, the multiple BB processors 856 may be compatible with multiple frequency bands used by the eNB 830. Although FIG. 20 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 20. For example, the multiple RF circuits 864 may support multiple antenna elements. Although FIG. 20 illustrates the example in which the wireless communication interface 863 includes the multiple RF circuits 864, the wireless communication interface 863 may also include a single RF circuit 864.

In the eNB 830 shown in FIG. 20, one or more constituent elements (the transmission processing unit 151 and/or the notification unit 153) included in the processing unit 150 described with reference to FIG. 17 may be implemented by the wireless communication interface 855 and/or the wireless communication interface 863. Alternatively, at least some of these constituent elements may be implemented by the controller 851. As an example, a module which includes a part (for example, the BB processor 856) or all of the wireless communication interface 855 and/or the controller 851 may be mounted in the eNB 830, and the above-described one or more constituent elements may be implemented by the module. In this case, the module may store a program for causing the processor to function as the above-described one or more constituent elements (i.e., a program for causing the processor to execute operations of the one or more constituent elements) and may execute the program. As another example, the program for causing the processor to function as the above-described one or more constituent elements may be installed in the eNB 830, and the wireless communication interface 855 (for example, the BB processor 856) and/or the controller 851 may execute the program. As described above, the eNB 830, the base station device 850 or the module may be provided as a device which includes the one or more constituent elements, and the program for causing the processor to function as the above-described one or more constituent elements may be provided. In addition, a readable recording medium in which the program is recorded may be provided.

In addition, in the eNB 830 shown in FIG. 20, for example, the wireless communication unit 120 described with reference to FIG. 17 may be implemented by the wireless communication interface 863 (for example, the RF circuit 864). Further, the antenna unit 110 may be implemented by the antenna 840. Moreover, the network communication unit 130 may be implemented by the controller 851 and/or the network interface 853. Further, the storage unit 140 may be implemented by the memory 852.

2-2. Application Example with Regard to Terminal Device

First Application Example

Figure 21:
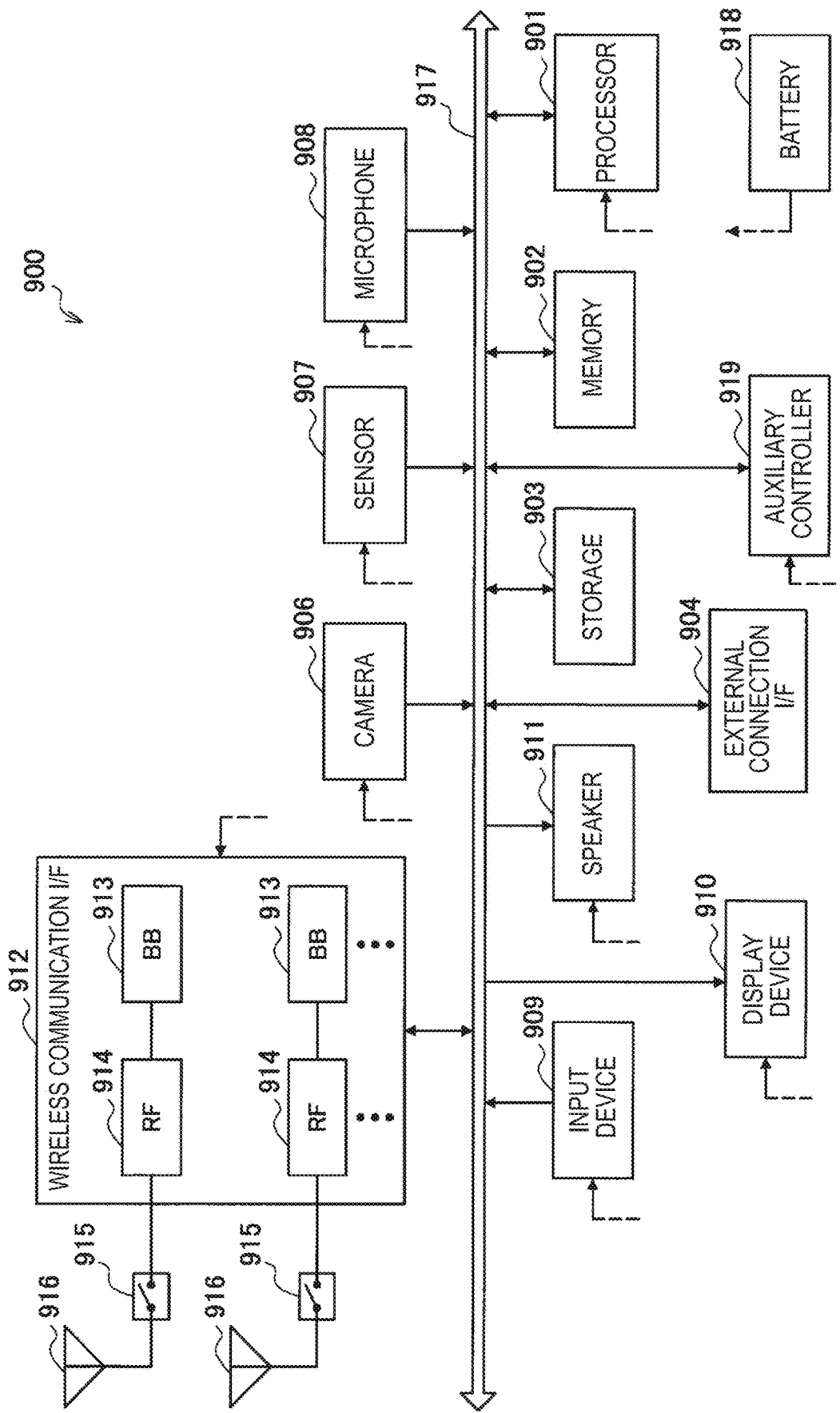
FIG. 21 is a block diagram illustrating an example of a schematic configuration of a smartphone 900 to which the technology of the present disclosure can be applied.

FIG. 21 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 21. Although FIG. 21 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 21. Although FIG. 21 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 21 via feeder lines, which are partially shown as dashed lines in the figure. The auxiliary controller 919 operates a minimum necessary function of the smartphone 900, for example, in a sleep mode.

In the smartphone 900 shown in FIG. 21, one or more constituent elements (the acquisition unit 241 and/or the reception processing unit 243) included in the processing unit 240 described with reference to FIG. 18 may be implemented by the wireless communication interface 912. Alternatively, at least some of these constituent elements may be implemented by the processor 901 or the auxiliary controller 919. As an example, a module which includes a part (for example, the BB processor 913) or all of the wireless communication interface 912, the processor 901 and/or the auxiliary controller 919 may be mounted in the smartphone 900, and the above-described one or more constituent elements may be implemented by the module. In this case, the module may store a program for causing the processor to function as the above-described one or more constituent elements (i.e., a program for causing the processor to execute operations of the above-described one or more constituent elements) and may execute the program. As another example, the program for causing the processor to function as the above-described one or more constituent elements may be installed in the smartphone 900, and the wireless communication interface 912 (for example, the BB processor 913), the processor 901 and/or the auxiliary controller 919 may execute the program. As described above, the smartphone 900 or the module may be provided as a device which includes the one or more constituent elements, and the program for causing the processor to function as the above-described one or more constituent elements may be provided. In addition, a readable recording medium in which the program is recorded may be provided.

In addition, in the smartphone 900 shown in FIG. 21, the wireless communication unit 220 described, for example, with reference to FIG. 18 may be implemented by the wireless communication interface 912 (for example, the RF circuit 914). Further, the antenna unit 210 may be implemented by the antenna 916. Moreover, the storage unit 230 may be implemented by the memory 902.

Second Application Example

Figure 22:
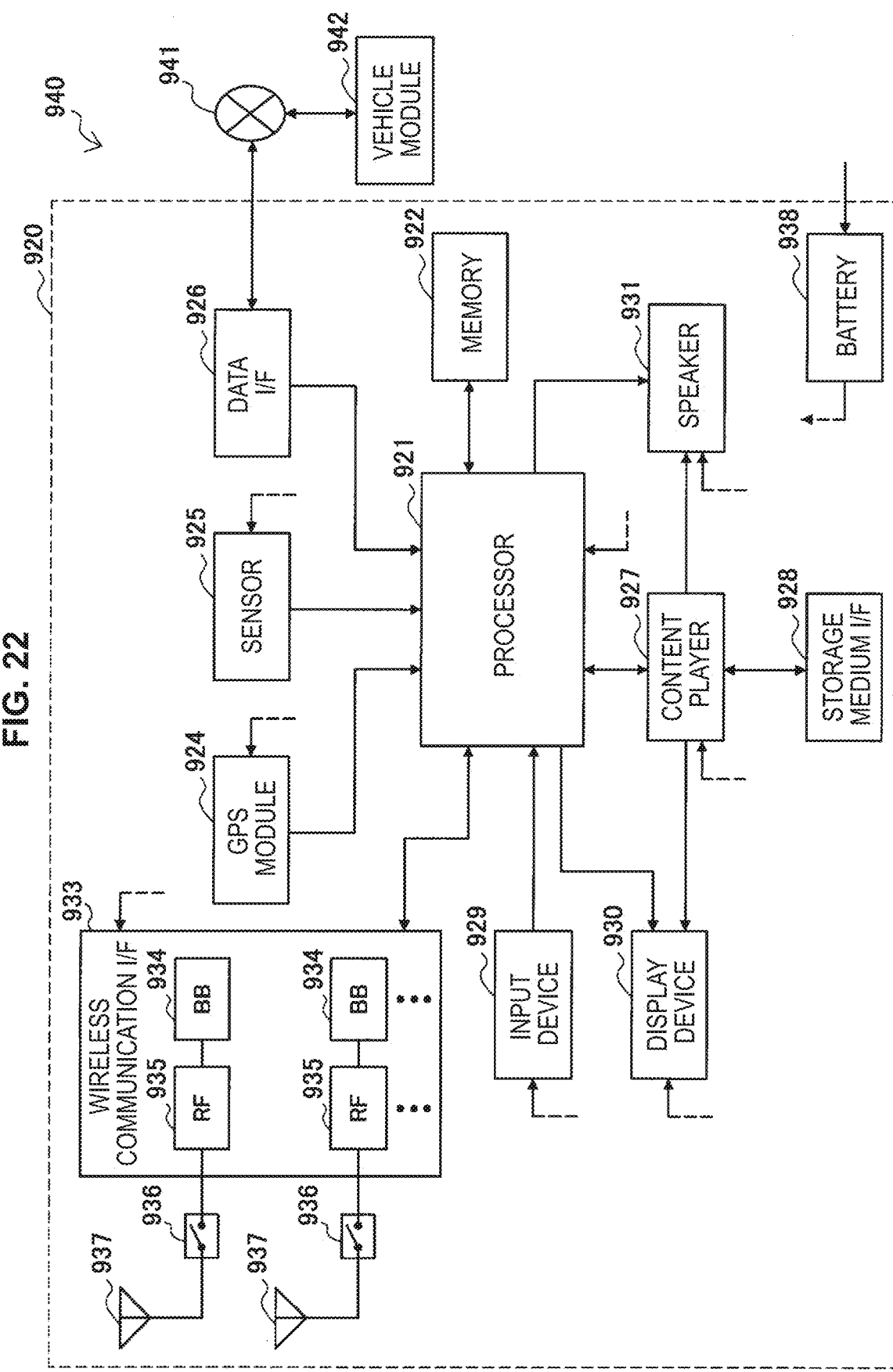
FIG. 22 is a block diagram illustrating an example of a schematic configuration of a car navigation device 920 to which the technology of the present disclosure can be applied.

FIG. 22 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as an LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 22. Although FIG. 22 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 22. Although FIG. 22 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 22 via feeder lines that are partially shown as dashed lines in the figure. The battery 938 accumulates power supplied from the vehicle.

In the car navigation device 920 shown in FIG. 22, one or more constituent elements (the acquisition unit 241 and/or the reception processing unit 243) included in the processing unit 240 described with reference to FIG. 18 may be implemented by the wireless communication interface 933. Alternatively, at least some of these constituent elements may be implemented by the processor 921. As an example, a module which includes a part (for example, the BB processor 934) or all of the wireless communication interface 933 and/or the processor 921 may be mounted in the car navigation device 920, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the above-described one or more constituent elements may be installed in the car navigation device 920, and the wireless communication interface 933 (for example, the BB processor 934) and/or the processor 921 may execute the program. As described above, the car navigation device 920 or the module may be provided as a device which includes the above-described one or more constituent elements, and the program for causing the processor to function as the above-described one or more constituent elements may be provided. In addition, a readable recording medium in which the program is recorded may be provided.

In addition, in the car navigation device 920 shown in FIG. 22, the wireless communication unit 220 described with reference to FIG. 18, for example, may be implemented by the wireless communication interface 933 (for example, the RF circuit 935). Further, the antenna unit 210 may be implemented by the antenna 937. Moreover, the storage unit 230 may be implemented by the memory 922.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the acquisition unit 241 and/or the reception processing unit 243. The vehicle module 942 generates vehicle data such as vehicle speed, engine speed, and trouble information, and outputs the generated data to the in-vehicle network 941.

3. CONCLUSION

According to embodiments of the present disclosure described above, a terminal device that is a terminal device that performs inter-device communication such as V2X communication and can efficiently select a resource using sensing and a base station that provides resources to such a terminal device are provided as will be described below.

It may not be necessary to chronologically execute respective steps in the processing, which is executed by each device of this specification, in the order described in the sequence diagrams or the flow charts. For example, the respective to steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication device including:

a control unit configured to allocate a resource area in which a resource is selectable by a terminal device that executes inter-device communication, and to provide information regarding a range of sensing of the resource area to the terminal device.

(2)

The communication device according to (1), in which the control unit sets the range of sensing in accordance with a type of traffic communicated by the terminal device using the resource.

(3)

The communication device according to (1), in which the control unit sets the range of sensing in accordance with a level of priority of traffic communicated by the terminal device using the resource.

(4)

The communication device according to any of (1) to (3), in which the control unit sets the range of sensing in accordance with a movement speed of the terminal device.

(5)

The communication device according to any of (1) to (4), in which the control unit sets the range of sensing in accordance with position information of the terminal device.

(6)

The communication device according to any of (1) to (5), in which the control unit sets the range of sensing in accordance with a type of the terminal device.

(7)

The communication device according to any of (1) to (6), in which the control unit sets the range of sensing in accordance with a resource use situation of sidelink.

(8)

The communication device according to any of (1) to (7), in which the control unit sets the range of sensing for each of the terminal devices.

(9)

The communication device according to any of (1) to (7), in which the control unit sets the range of sensing commonly for all the terminal devices.

(10)

The communication device according to any of (1) to (9), in which the control unit performs grouping for each predetermined range of the resource area.

(11)

The communication device according to (10), in which the control unit provides information for causing the terminal device to execute resource hopping in a grouped range.

(12)

The communication device according to any of (1) to (10), in which the control unit provides information regarding an interval from selection of the resource to transmission of information by the terminal device.

(13)

The communication device according to (12), in which the control unit sets the interval in accordance with a type of traffic communicated by the terminal device using the resource.

(14)

The communication device according to (12), in which the control unit sets the interval in accordance with a level of priority of traffic communicated by the terminal device using the resource.

(15)

The communication device according to any of (12) to (14), in which the control unit sets the interval in accordance with a movement speed of the terminal device.

(16)

The communication device according to any of (12) to (15), in which the control unit sets the interval in accordance with position information of the terminal device.

(17)

The communication device according to any of (12) to (16), in which the control unit sets the interval in accordance with a type of the terminal device.

(18)

The communication device according to any of (12) to (17), in which the control unit sets the interval for each of the terminal devices.

(19)

The communication device according to any of (12) to (17), in which the control unit sets the interval commonly for all the terminal devices.

(20)

A communication device including:

a control unit configured to select a resource from a resource area allocated by a base station and to determine a range of sensing of the resource area in accordance with a situation when inter-device communication is executed using the selected resource.

(21)

The communication device according to (20), in which the control unit determines the range of sensing on a basis of information provided by the base station.

(22)

The communication device according to (20) or (21), in which the control unit determines an interval from selection of the resource to transmission of information on a basis of a result of the sensing in accordance with a situation.

(23)

The communication device according to (23), in which the control unit determines the interval on a basis of information provided by the base station.

(24)

The communication device according to (22) or (23), in which the control unit transmits information regarding a level of priority of information as the information.

(25)

The communication device according to any of (22) to (24), in which the control unit transmits information regarding a transmission source of information as the information.

(26)

The communication device according to any of (22) to (25), in which the control unit transmits information regarding transmission power of information as the information.

(27)

The communication device according to any of (22) to (26), in which the control unit notifies another device of information regarding reservation of the resource, by using information of the interval.

(28)

The communication device according to any of (20) to (27), in which the control unit extends the range of sensing in a case in which a resource is failed to be secured as a result of the sensing.

(29)

The communication device according to (28), in which the control unit re-determines the range of sensing of the resource area in accordance with a situation in a case in which a resource is failed to be secured even if the range of sensing is extended by a predetermined amount.

(30)

The communication device according to (29), in which the control unit gives a report to the base station when re-determination of the range of sensing is performed a predetermined number of times.

(31)

The communication device according to any of (20) to (30), in which the control unit changes a threshold value when a resource is selected through energy sensing on a basis of transmission power information at a time of the inter-device communication.

(32)

A communication method including:

allocating a resource area in which a resource is selectable by a terminal device that executes inter-device communication, and providing information regarding a range of sensing of the resource area to the terminal device.

(33)

A communication method including:

selecting a resource from a resource area allocated by a base station and determining a range of sensing of the resource area in accordance with a situation when inter-device communication is executed using the selected resource.

(34)

A computer program causing a computer to execute:

allocating a resource area in which a resource is selectable by a terminal device that executes inter-device communication, and providing information regarding a range of sensing of the resource area to the terminal device.

(35)

A computer program causing a computer to execute:

selecting a resource from a resource area allocated by a base station and determining a range of sensing of the resource area in accordance with a situation when inter-device communication is executed using the selected resource.

(36)

A communication device including:

a control unit configured to select a resource from a resource area allocated by a base station and to set a parameter relating to sensing by using one or more of a parameter relating to a sensing mode and a parameter relating to a packet reservation cycle notified by the base station when inter-device communication is executed using the selected resource.

(37)

The communication device according to (36), in which the parameter relating to the packet reservation is defined as a set of parameters i.

(38)

The communication device according to (37), in which the parameter i is a constituent element of a packet reservation cycle (P*i), P is a fixed value serving as a base, and i is a parameter that is settable from a network.

(39)

The communication device according to any of (37) or (38), in which the parameter relating to the sensing mode is defined as a parameter a.

(40)

The communication device according to (39), in which, which of a plurality of setting methods for the parameter relating to sensing with the same i is to be used is decided using the parameter a.

(41)

The communication device according to (36), in which the parameter relating to the sensing includes a starting position of a sensing window, a size of a sensing window, a frequency band of sensing, a resource pool of sensing, and a sensing window number.

(42)

The communication device according to (36), in which the control unit sets the parameter relating to the sensing by using one or more of a packet reservation cycle notified by the base station, a channel busy ratio (CBR) of a network, a parameter relating to packet reselection, and a parameter indicating a sensing target area.

(43)

The communication device according to (36), in which, after sensing is performed a predetermined number of sensing times or more, the control unit calculates a use ratio of resources among given transmission resource candidates, and sets a new sensing candidate and performs sensing when the use ratio is higher than or equal to a predetermined value.

(44)

The communication device according to (36), in which, after sensing is performed a predetermined number of sensing times or more, the control unit calculates a use ratio of resources among given transmission resource candidates, and stops sensing when the use ratio is higher than or equal to a predetermined value.

(45)

The communication device according to (43), in which a threshold value of the number of sensing times and a threshold value 0 of the use ratio are set from a network side.

(46)

The communication device according to (43), in which the control unit sets a new sensing candidate, completes sensing, and selects a transmission resource on a basis of all sensing results.

(47)

The communication device according to (46), in which the control unit sets the new sensing candidate at random.

(48)

The communication device according to (46), in which the control unit receives a setting of the new sensing candidate from a network side.

(49)

The communication device according to (43), in which, when the control unit stops sensing and selects a transmission resource, the control unit selects an available resource among given transmission resource candidates based on a sensing result and all resources other than the transmission resource candidates as selection candidates.

(50)

A communication control method including:

selecting a resource from a resource area allocated by a base station and setting a parameter relating to sensing by using one or more of a parameter relating to a sensing mode and a parameter relating to a packet reservation cycle notified by the base station when inter-device communication is executed using the selected resource.

REFERENCE SIGNS LIST

100 terminal device
200 base station

The invention claimed is:
1. A communication device comprising:
a controller having circuitry configured to:
allocate a resource area in which a resource is selectable by a terminal device that executes inter-device communication, and provide information regarding a range of sensing of the resource area to the terminal device;
wherein the range of sensing is divided into a plurality of sub-sensing periods; and
the circuitry is further configured to:
provide a parameter which indicates a sub-sensing; window in the sub-sensing periods.

2. The communication device according to claim 1, wherein the controller sets the range of sensing in accordance with at least one of
(a) a type of traffic communicated by the terminal device using the resource,
(b) a level of priority of traffic communicated by the terminal device using the resource,
(c) a movement speed of the terminal device,
(d) position information of the terminal device,
(e) a type of the terminal device, and
(f) a resource use situation of sidelink.

3. The communication device according to claim 1, wherein the controller sets the range of sensing for each of the terminal devices, or sets the range of sensing commonly for all the terminal devices.

4. The communication device according to claim 1, wherein the controller provides information regarding an interval from selection of the resource to transmission of information by the terminal device, wherein the controller sets the interval in accordance with at least one of
(a) a type of traffic communicated by the terminal device using the resource,
(b) a level of priority of traffic communicated by the terminal device using the resource,
(c) a movement speed of the terminal device,
(d) position information of the terminal device, and
(e) a type of the terminal device, wherein
the controller sets the interval for each of the terminal devices, or
sets the interval commonly for all the terminal devices.

5. The communication device according to claim 1, wherein the parameter includes at least one of:
a starting point of sensing;
a size of a sensing window,
a frequency domain of sensing,
a resource pool of sensing, or
a sensing window number.

6. The communication device according to claim 1, wherein the parameter is indicated in a bitmap.

7. The communication device according to claim 1, wherein a size of a selection period is used to indicate a selection from a resource pool of sensing, and in which communication between the communication device and the terminal device is executed, is same as a size of a sub-sensing period including the sub-sensing window.

8. The communication device according to claim 1, wherein the range of sensing is divided into 10 sub-sensing period.

9. The communication device according to claim 1, wherein a size of a selected period which is selected from a resource pool of sensing, and in which communication between the communication device and the terminal device is executed, is same as a size of a selection window.

10. A communication method comprising:
allocating a resource area in which a resource is selectable by a terminal device that executes inter-device communication, and providing information regarding a range of sensing of the resource area to the terminal device;
wherein the range of sensing is divided into a plurality of sub-sensing periods; and
the method further comprising:
providing a parameter which indicates a sub-sensing window in the sub-sensing periods.

11. A communication device comprising:
a controller having circuitry configured to:
select a resource from a resource area allocated by a base station and to
determine a range of sensing of the resource area in accordance with a situation when inter-device communication is executed using the selected resource;
wherein the range of sensing is divided into a plurality of sub-sensing periods, and
the circuitry is further configured to
receive a parameter which indicates a sub-sensing window for the sub-sensing periods.

12. The communication device according to claim 11, wherein the controller determines an interval from selection of the resource to transmission of information on a basis of a result of the sensing in accordance with a situation, wherein the controller is further configured to perform at least one of
(a) determines the interval on a basis of information provided by the base station,
(b) transmits information regarding a level of priority of information as the information,
(c) transmits information regarding a transmission source of information as the information,
(d) transmits information regarding transmission power of information as the information,
(e) notifies another device of information regarding reservation of the resource, by using information of the interval, and
(f) extends the range of sensing in a case in which a resource is failed to be secured as a result of the sensing, wherein
the controller re-determines the range of sensing of the resource area in accordance with a situation in a case in which a resource is failed to be secured even if the range of sensing is extended by a predetermined amount and/or
gives a report to the base station when re-determination of the range of sensing is performed a predetermined number of times.

13. The communication device according to claim 11, wherein the controller changes a threshold value when a resource is selected through energy sensing on a basis of transmission power information at a time of the inter-device communication.

14. A communication control method comprising:
selecting a resource from a resource area allocated by a base station and setting a parameter relating to sensing by using one or more of a parameter relating to a sensing mode and a parameter relating to a packet reservation cycle notified by the base station when inter-device communication is executed using the selected resource;
wherein the range of sensing is divided into a plurality of sub-sensing periods; and
the method further comprising:
receiving a parameter which indicates a sub-sensing window in the sub-sensing periods.

* * * * *